April 16, 1968 S. B. WILLIAMS 3,377,798
BEARING AND DRIVE CONSTRUCTION FOR GAS TURBINE ENGINES
Original Filed Feb. 1, 1965 15 Sheets-Sheet 1

INVENTOR.
Sam B. Williams.
BY
ATTORNEYS.

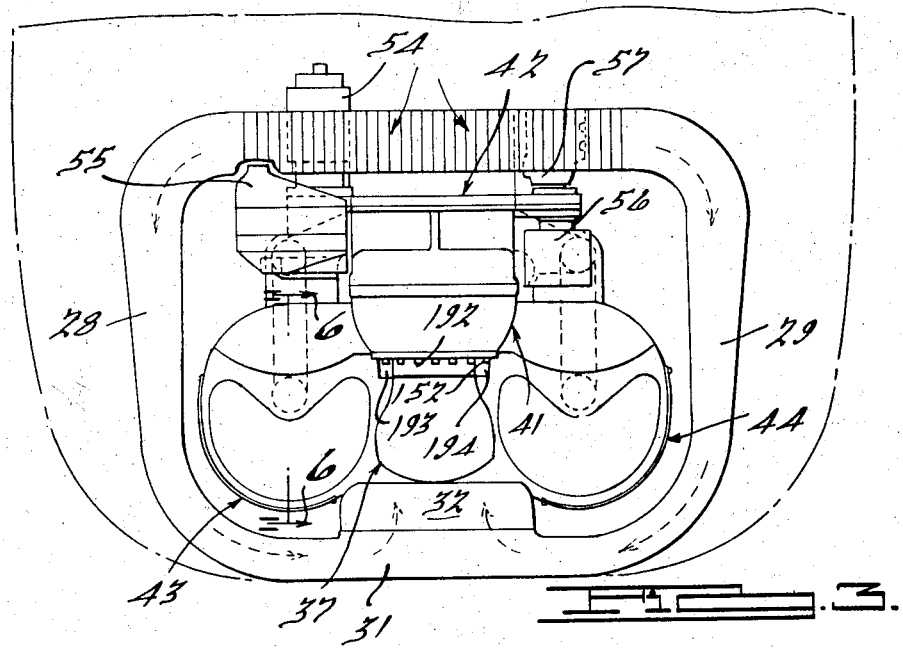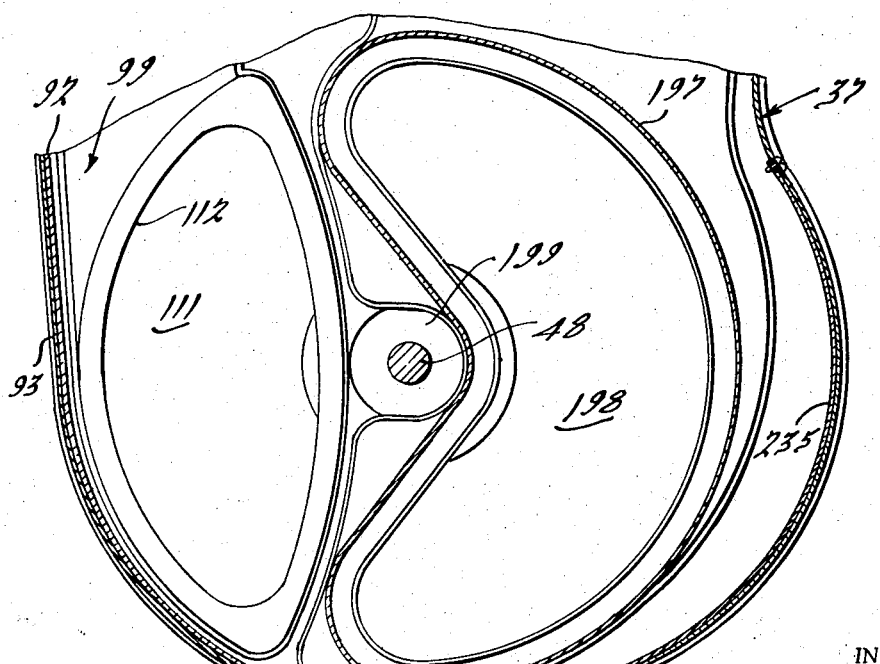

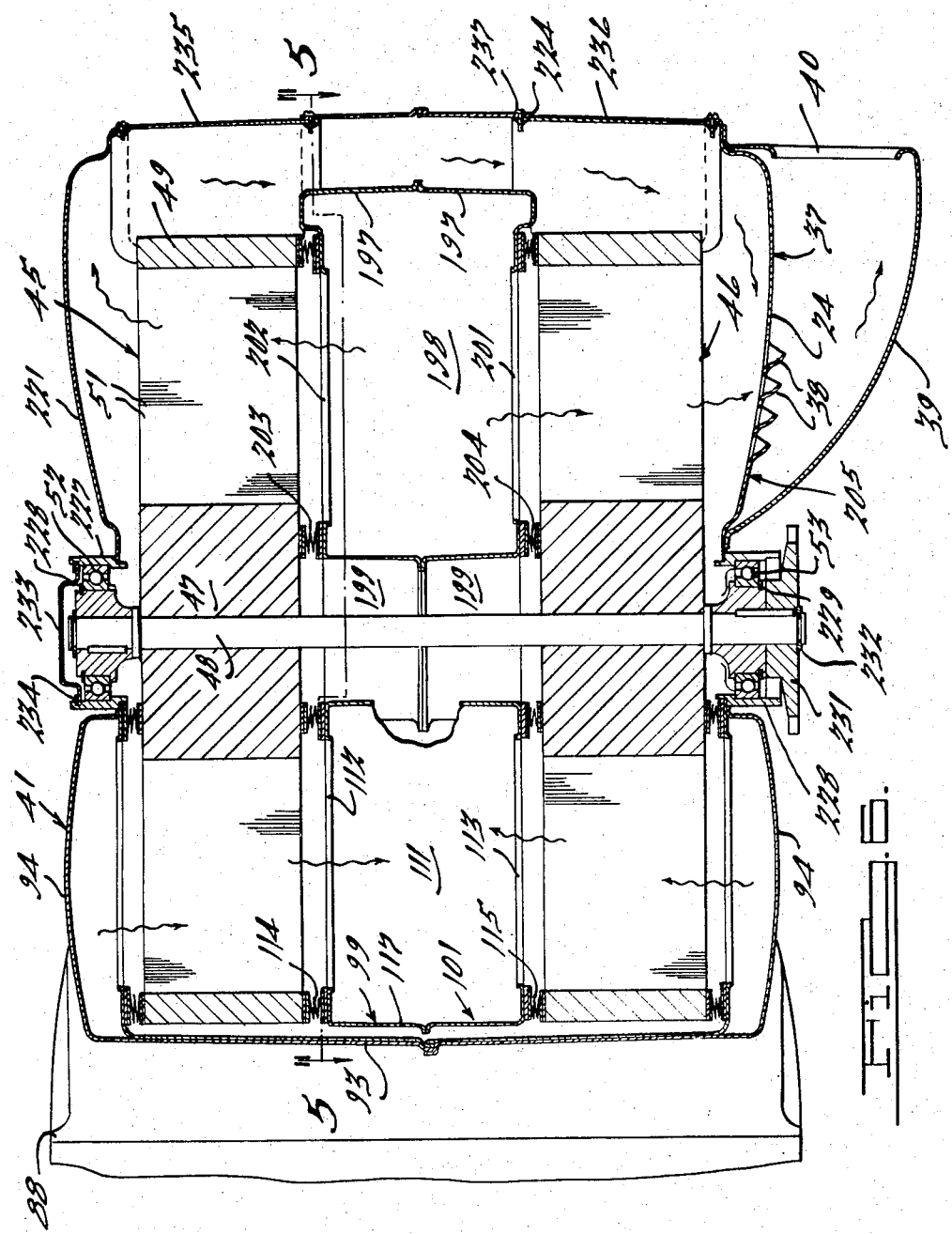

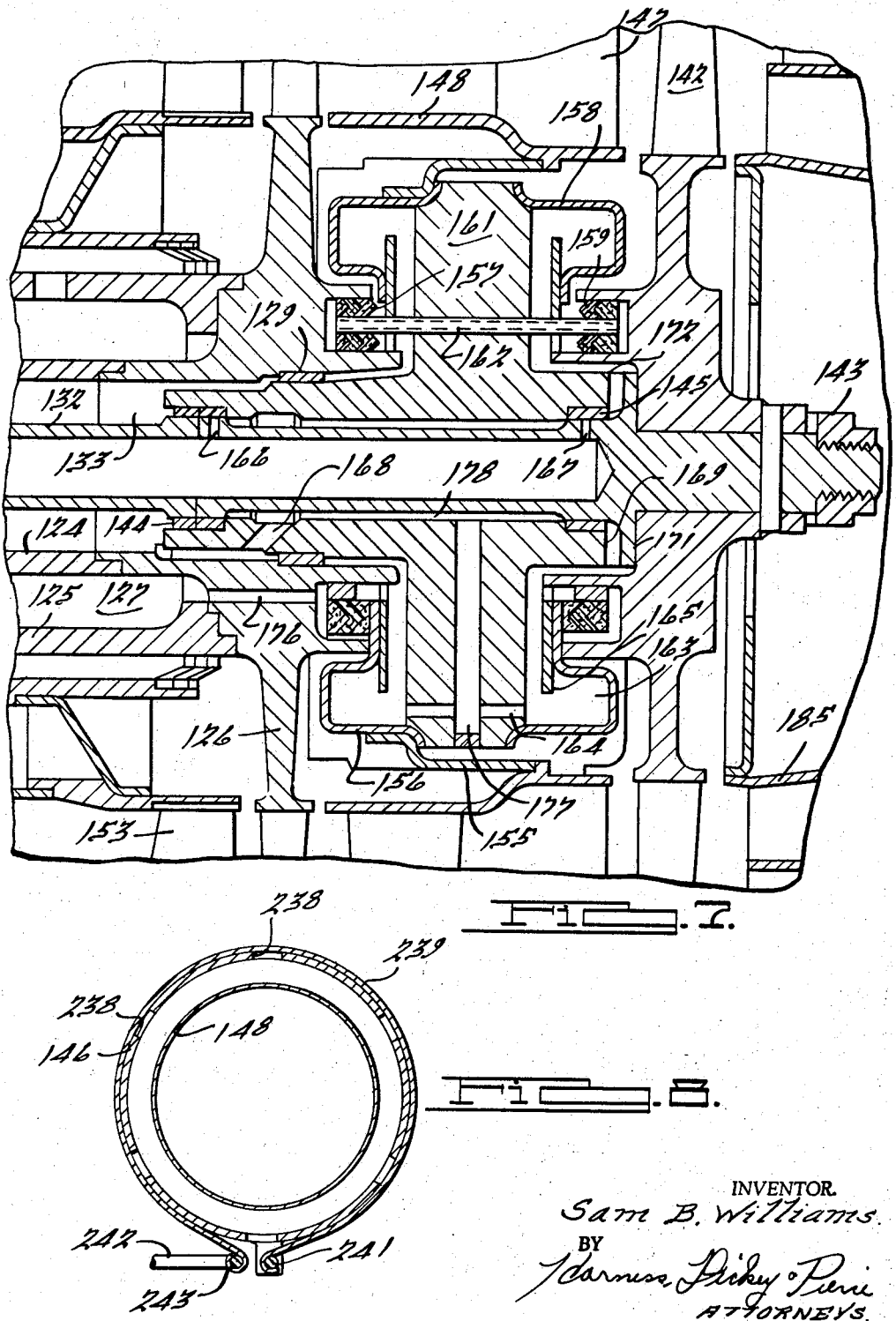

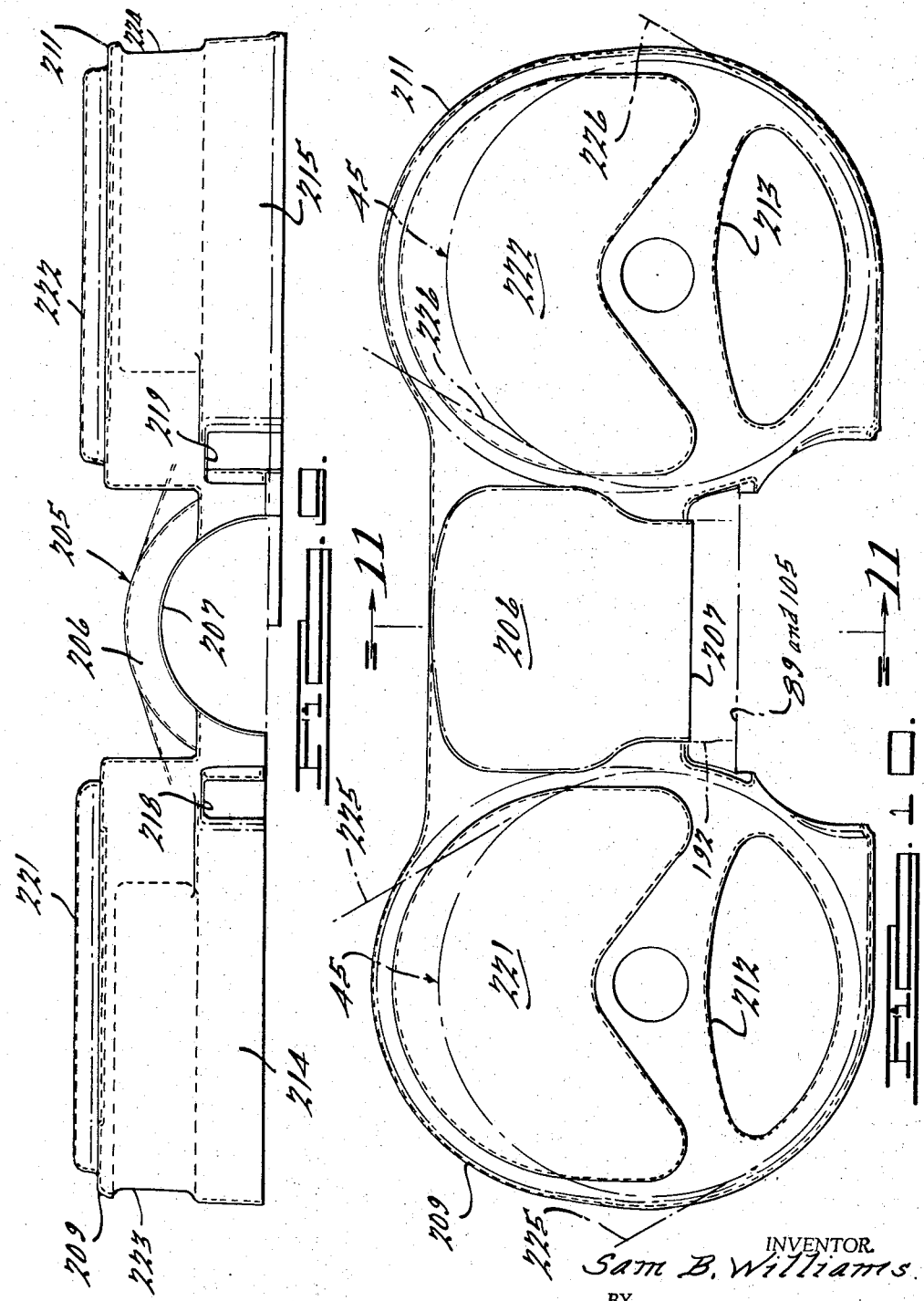

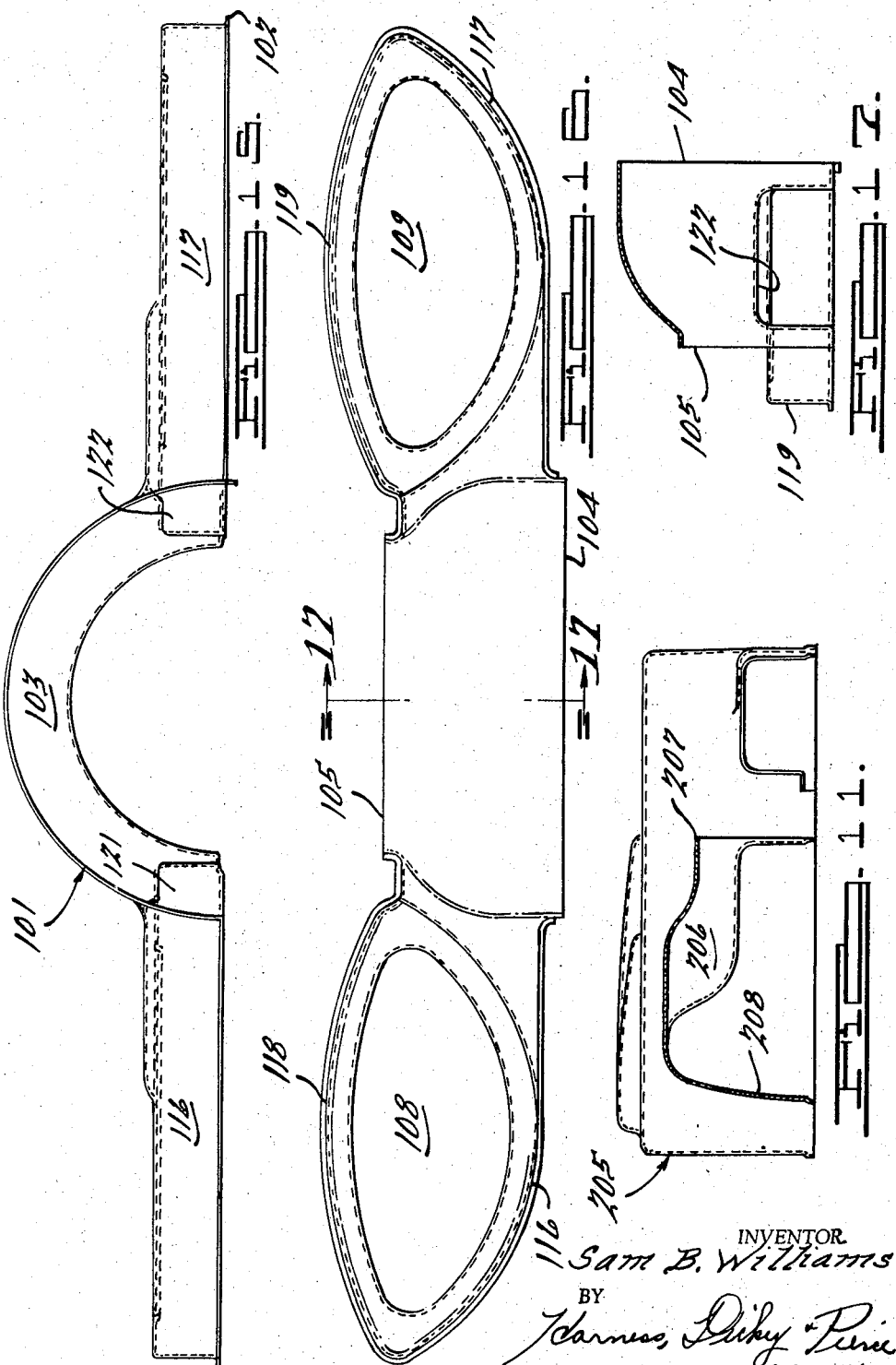

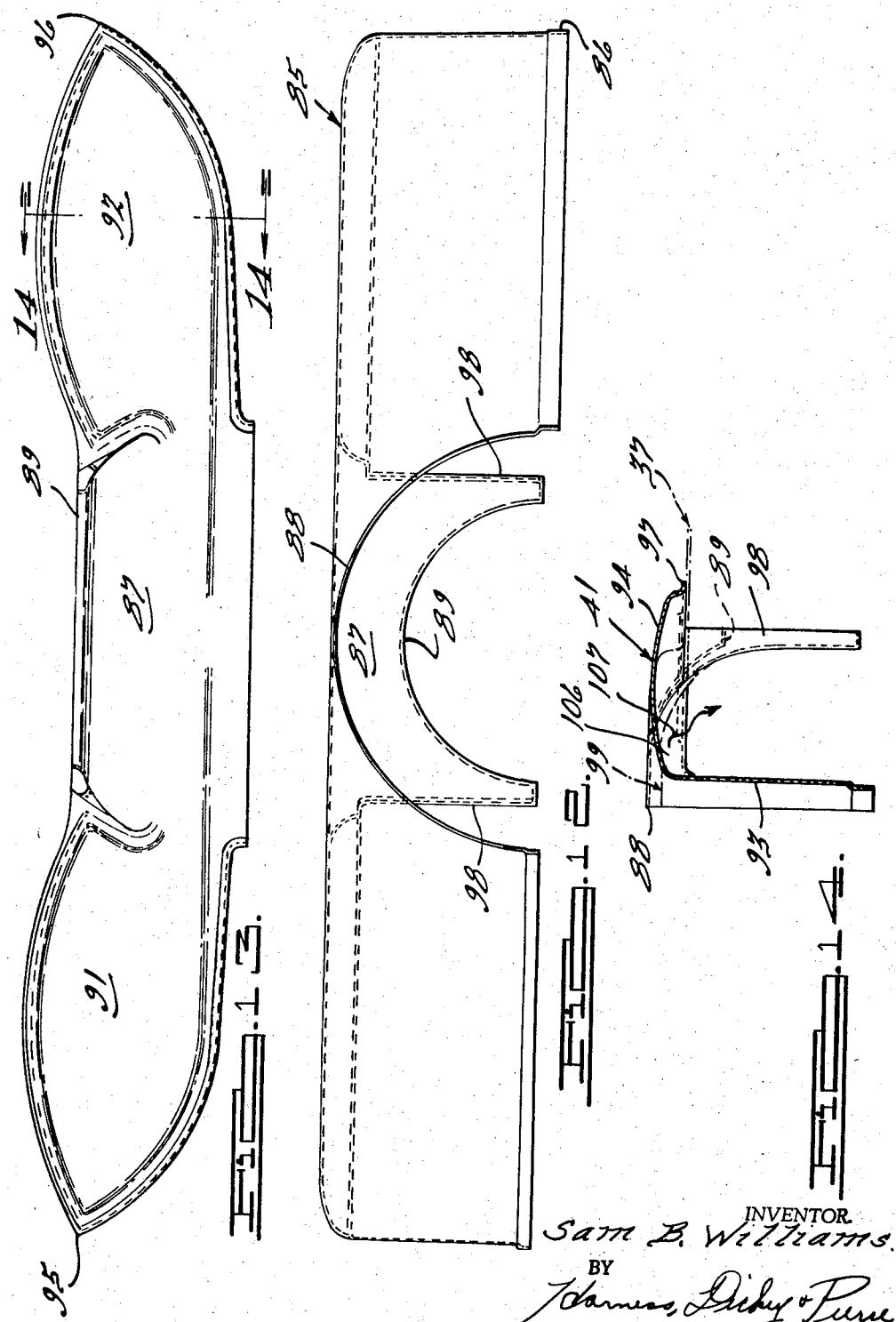

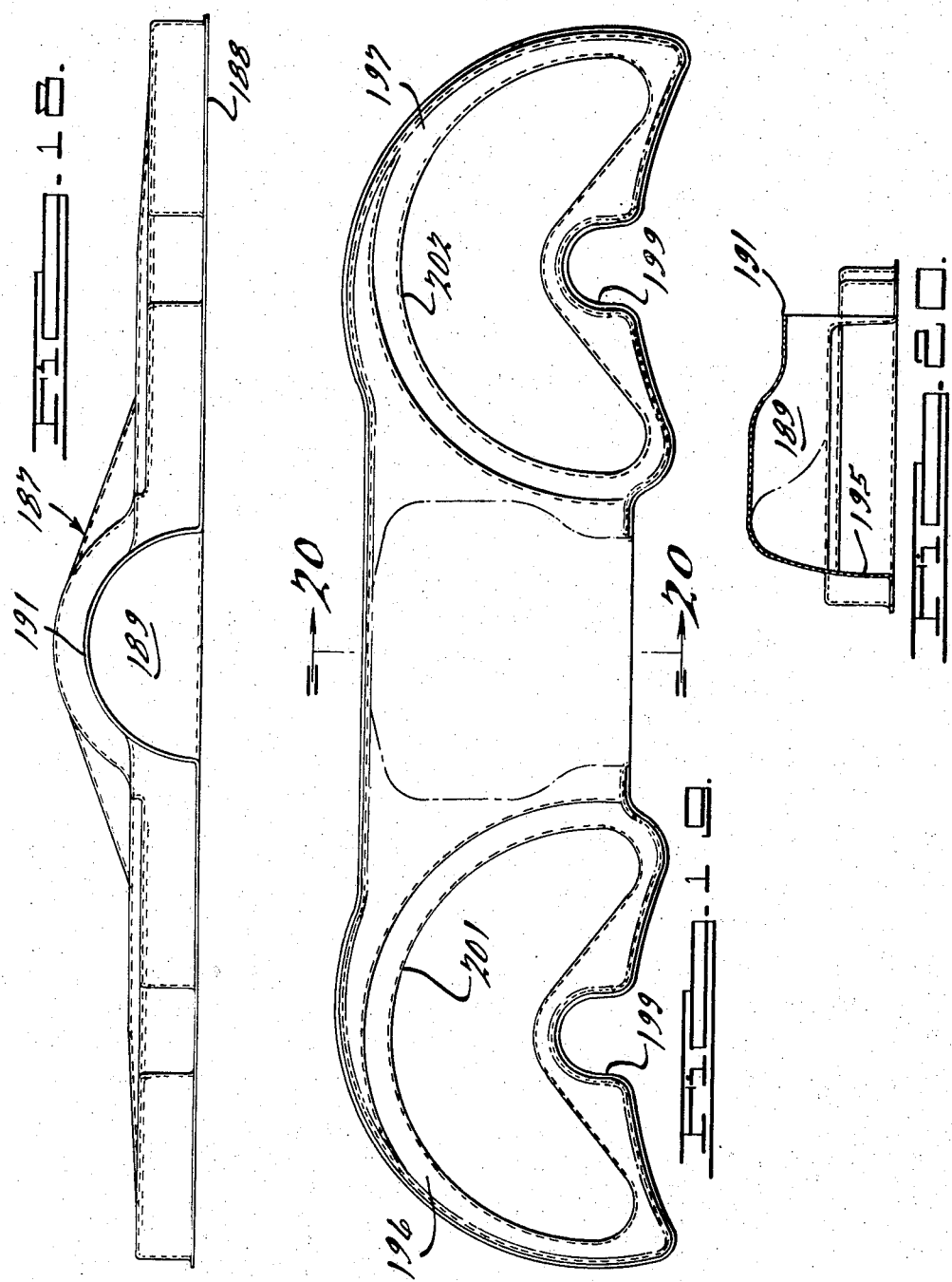

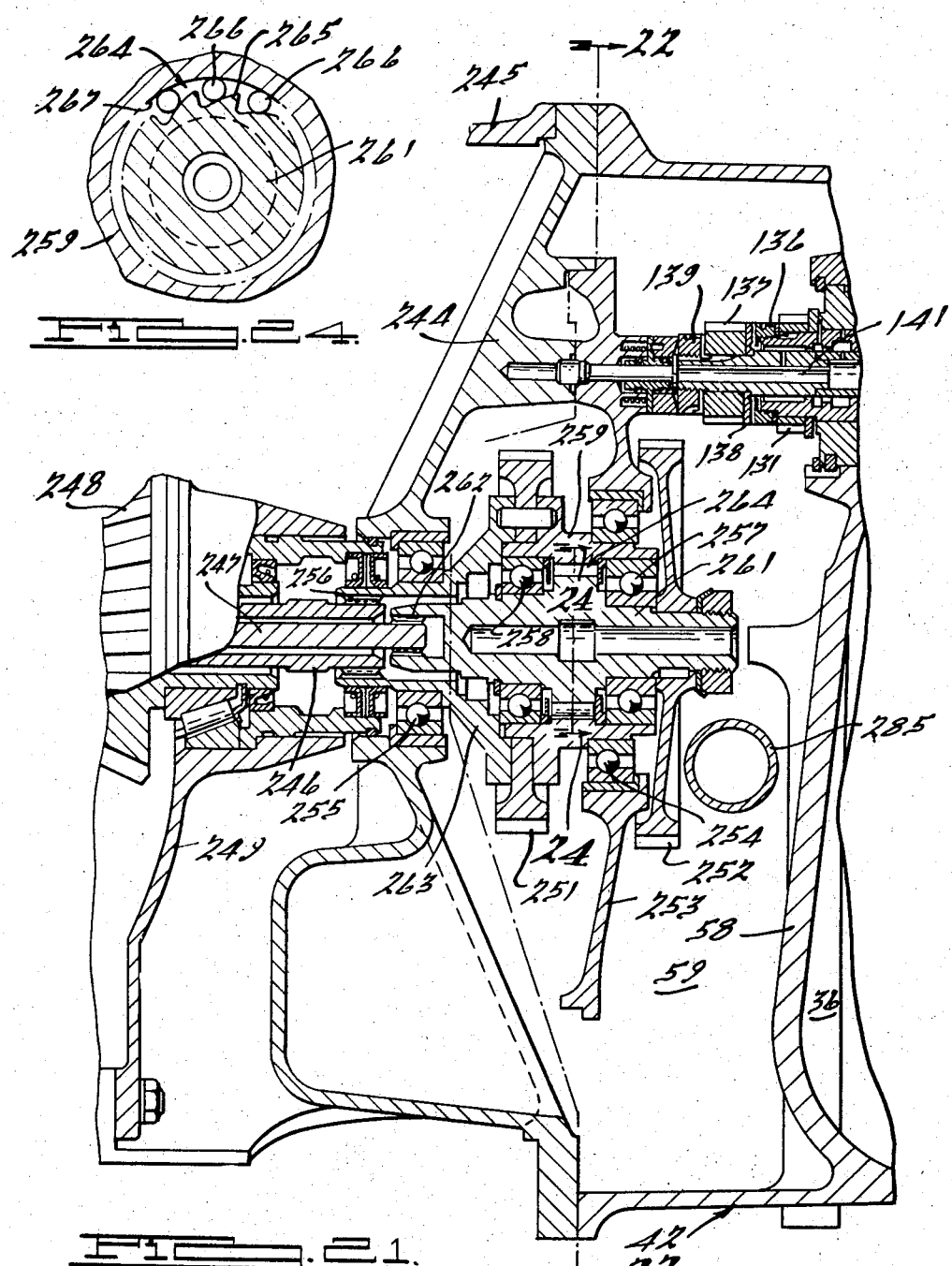

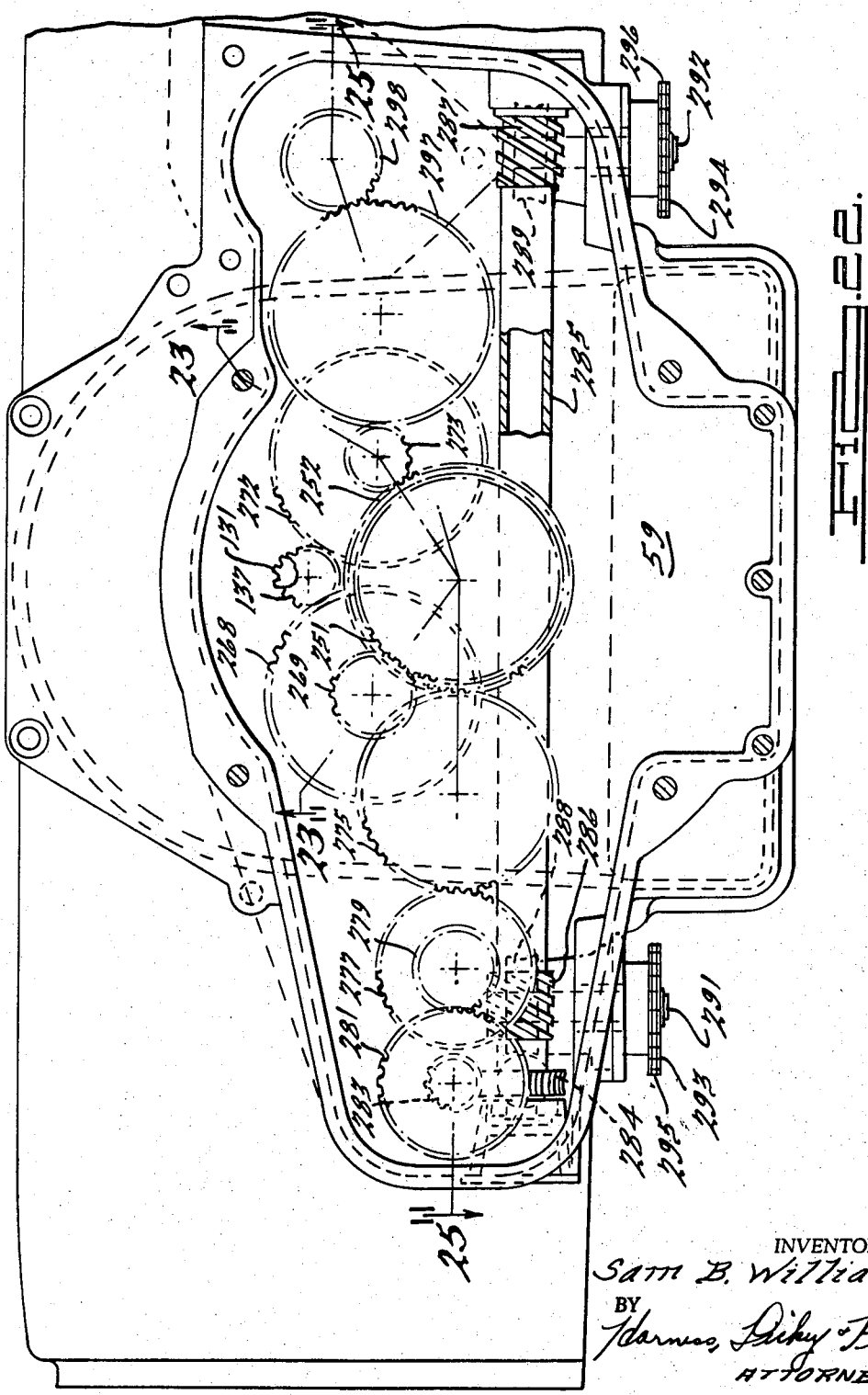

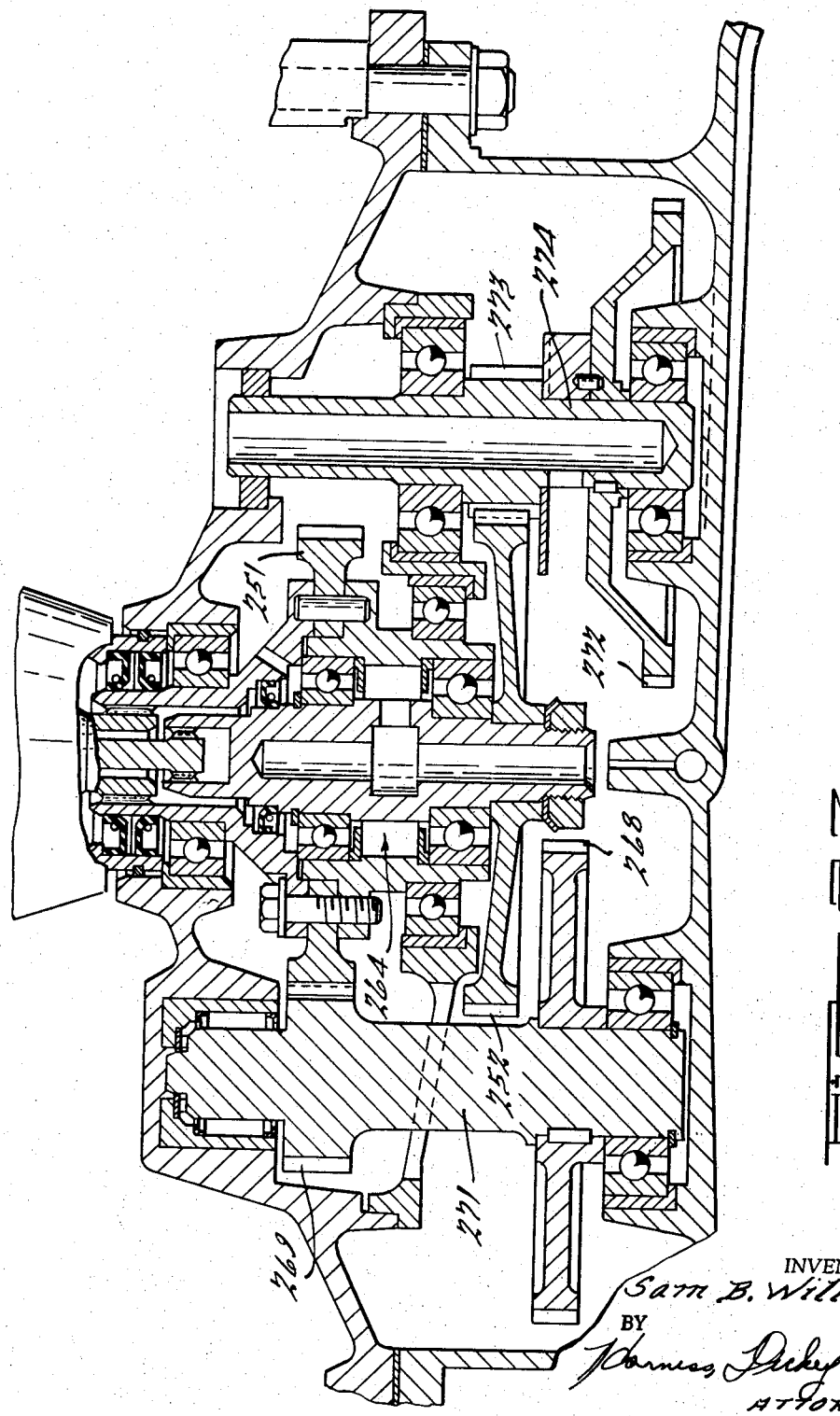

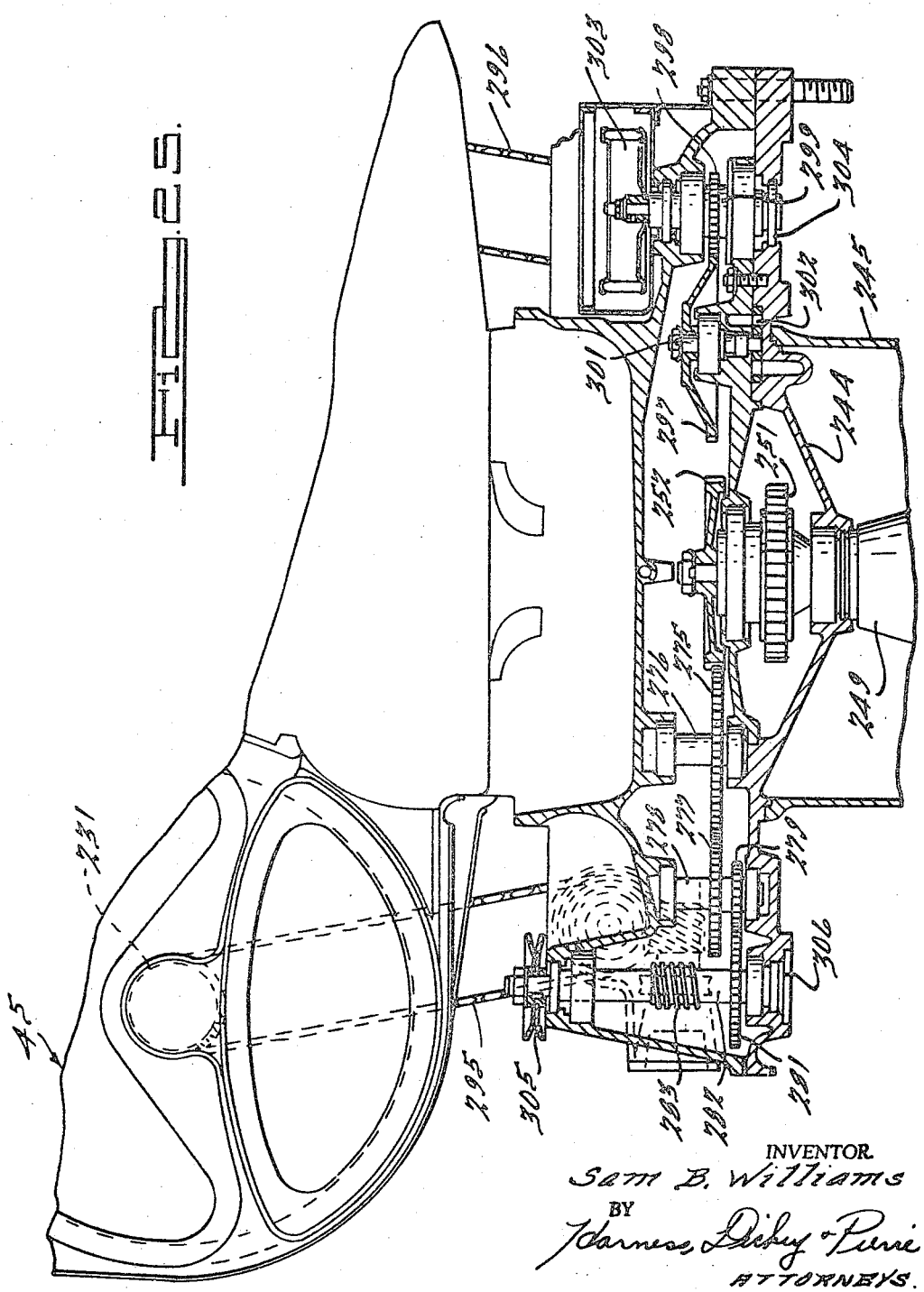

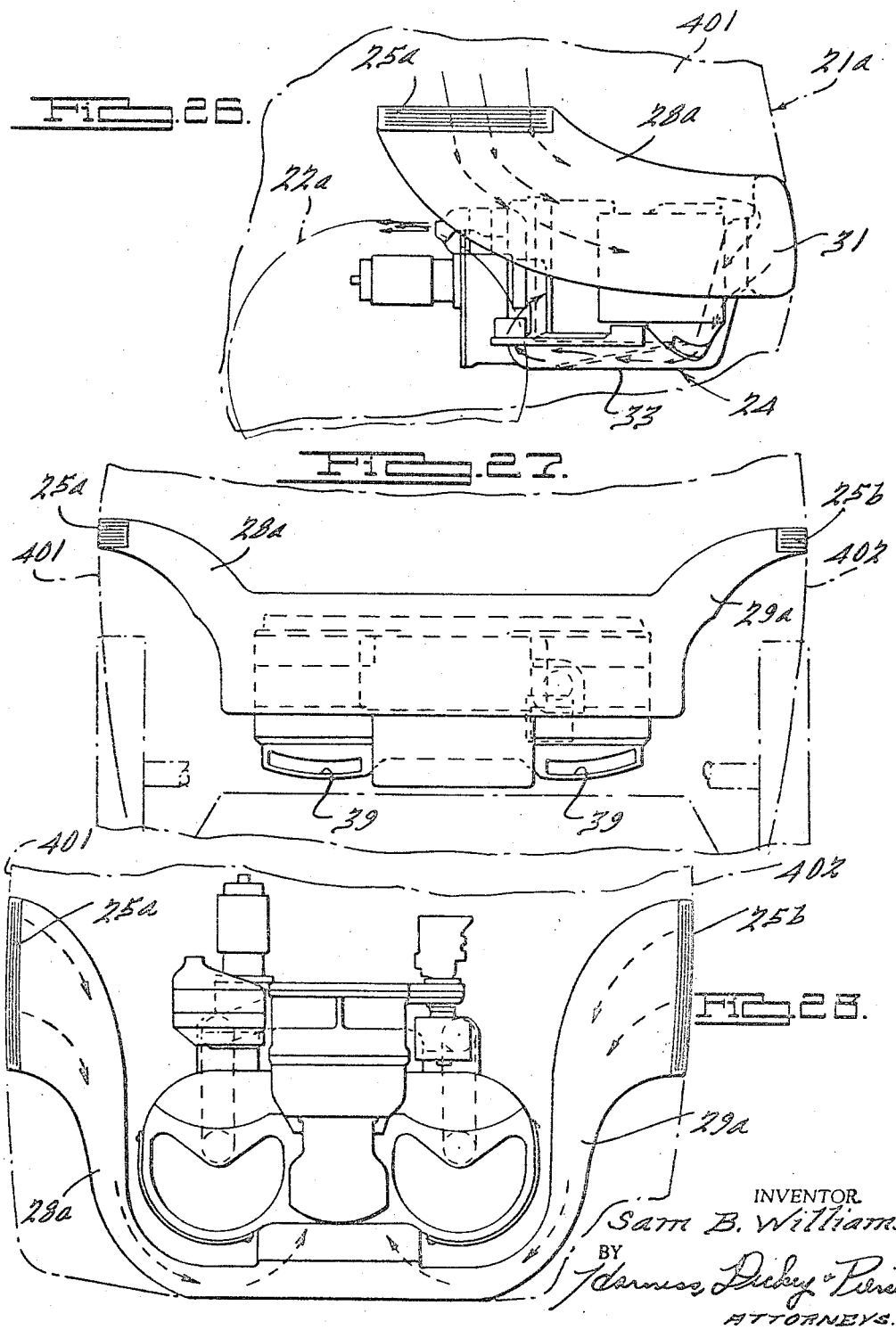

April 16, 1968     S. B. WILLIAMS     3,377,798
BEARING AND DRIVE CONSTRUCTION FOR GAS TURBINE ENGINES
Original Filed Feb. 1, 1965     15 Sheets-Sheet 15
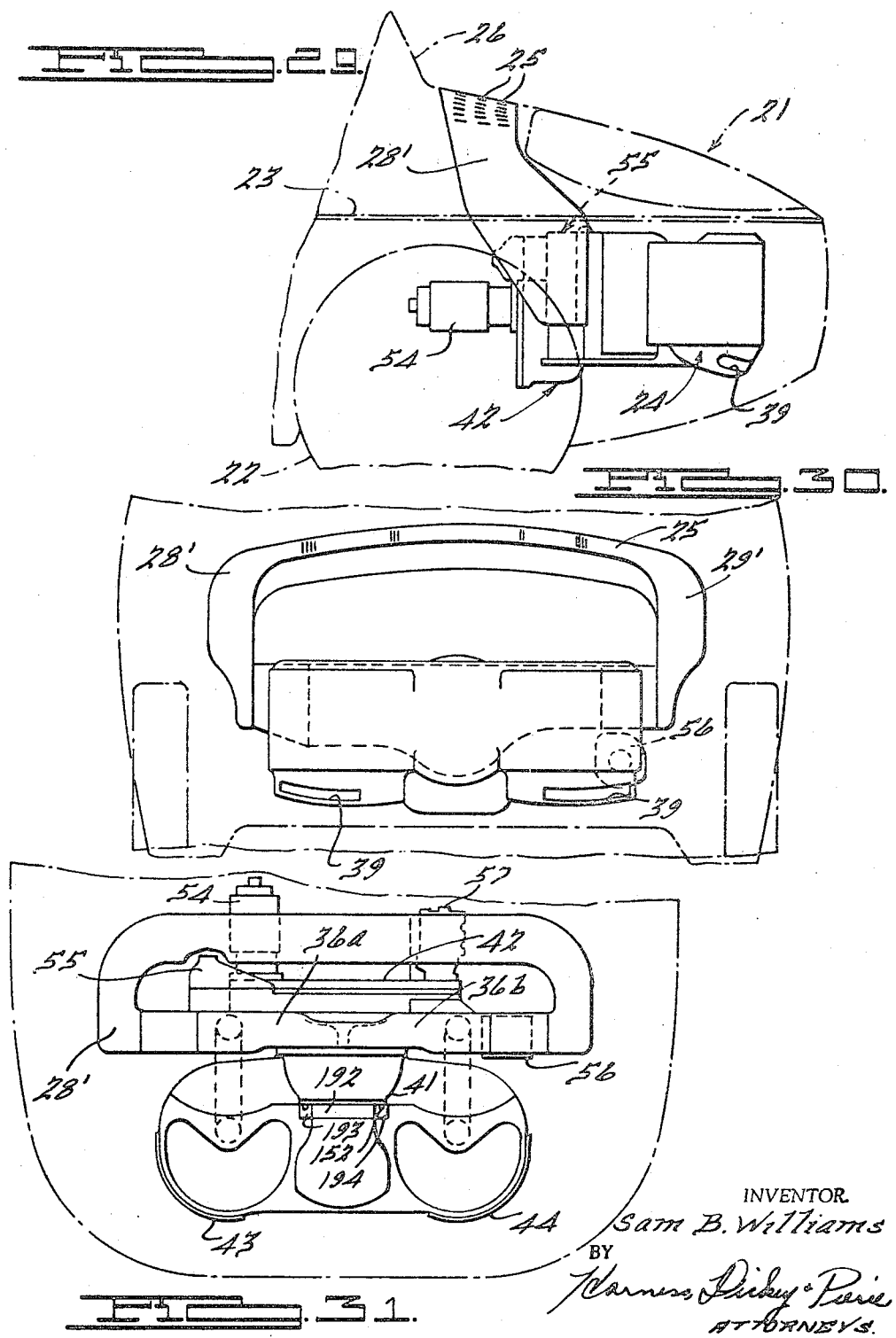
INVENTOR.
Sam B. Williams
BY
Harness, Dickey & Pierce
ATTORNEYS.

United States Patent Office 3,377,798
Patented Apr. 16, 1968

3,377,798
BEARING AND DRIVE CONSTRUCTION FOR
GAS TURBINE ENGINES
Sam B. Williams, Walled Lake, Mich., assignor to Williams Research Corporation, Walled Lake, Mich., a corporation of Michigan
Original application Feb. 1, 1965, Ser. No. 429,600. Divided and this application Dec. 12, 1966, Ser. No. 630,474
14 Claims. (Cl. 60—39.08)

ABSTRACT OF THE DISCLOSURE

A gas turbine engine in an automotive vehicle having a bearing lubrication system utilizing turbine shafts, a gas bleed between the turbine stages, and an overrunning clutch between coaxial gears of an automatic transmission driven by the engine.

---

This is a division of application Ser. No. 429,600, filed Feb. 1, 1965.

This invention relates to gas turbines, and more particularly to engines of this type especially adapted for use in automotive vehicles.

It is an object of the present invention to provide a novel and improved gas turbine which may be mounted in the rear portion of a vehicle beneath the deck, thereby eliminating the need for exhaust ducts extending beneath the vehicle and greatly simplifying the power train.

It is another object to provide an improved regenerative gas turbine of this character in which the regenerator matrices are on axes spaced laterally from and transverse to the turbine axis, thus creating a relatively flat overall configuration for the unit which has space location advantages.

It is a further object to provide an improved gas turbine of this nature which may be constructed largely of pairs of sheet metal stampings with the joints being brazed, thus facilitating inexpensive high quantity production.

It is also an object to provide an improved gas turbine having these characteristics, in which the temperature of the outside of the unit will be no higher than that of the exhaust gases emitted from the regenerators, thus minimizing heat losses and insulation problems, as well as reducing radiation to adjacent parts.

It is another object to provide an improved gas turbine of this nature which eliminates the need for external oil lines for either the front or rear bearings of the compressor and power shafts, utilizing instead compressed air which aids in transmitting oil to the bearings along an internal path.

It is also an object to provide an improved gas turbine of this character in which proper bearing support is insured for the power shaft when it is in stalled condition and thus has its highest bearing load, the construction preventing breakdown of the hydrodynamic load-carrying oil film in the forward power shaft bearing.

It is a further object to provide an improved gas turbine of this nature which incorporates a bleedoff valve between the first and second stages, thus reducing the power and fuel rate at idle when the load is braked but still connected to the second stage, and permitting idling at a lower compressor speed.

It is another object to provide an improved gas turbine having these characteristics, in which the entire turbine housing is secured to its support at only one end, thus eliminating expansion and contraction problems arising from temperature variations during operations.

It is also an object to provide a gas turbine of this character in which the regenerators and seals may be easily removed from or inserted into the housing without disturbing the engine structure or alignment of components, the means for accomplishing this object comprising removable doors on the low pressure exhaust duct, thus eliminating the need for heavy flanged and bolted joints in the high pressure duct system.

It is another object to provide an improved combination of a gas turbine engine with a vehicle having an automatic transmission, which utilizes a conventional concentric gear arrangement for the transmission power and oil pump drives to connect the power drive with the turbine compressor, thereby permitting use of the compressor as a brake to prevent excessive second stage turbine speeds.

It is a further object to provide an improved regenerator gas turbine of this type in which novel means are provided for driving the rotary regenerator matrices in such a way as to allow for relative movement of the parts due to temperature variations.

Other objects, features and advantages of the present invention will become apparent from the subsequent description, taken in conjunction with the accompanying drawings.

In the drawings:

FIGURE 3 is a top plan view of the vehicle;

FIGURE 5 is a sectional plan view in the vicinity of one of the regenerator matrices taken along the line 5—5 of FIGURE 6;

FIGURE 6 is a cross-sectional view of the regenerator structure taken along the line 6—6 of FIGURE 3;

FIGURE 7 is an enlarged fragmentary view in cross section of the rear bearing portion of the turbine taken in the area marked 7 of FIGURE 4, the view, however, being in elevation instead of in plan;

FIGURE 8 is a cross-sectional view taken along the line 8—8 of FIGURE 4 and showing the bypass valve between the first and second stages;

FIGURE 9 is a front end elevational view of one of the stampings which comprises the main turbine housing;

FIGURE 10 is a top plan view of this stamping;

FIGURE 11 is a cross-sectional view in elevation of this housing taken along the line 11—11 of FIGURE 10;

FIGURE 12 is a rear end elevational view of one of the stampings of the pair which form the duct leading compressed air to the regenerators;

FIGURE 13 is a top plan view of this stamping;

FIGURE 14 is a cross-sectional view of this stamping taken along the line 14—14 of FIGURE 13;

FIGURE 15 is a rear end elevational view of one of the stampings of the pair which form ducts leading heated air from the regenerators to the burner;

FIGURE 16 is a top plan view of this stamping;

FIGURE 17 is a cross-sectional view in elevation of this stamping taken along the line 17—17 of FIGURE 16;

FIGURE 18 is a front end elevational view of one of the stampings of the pair which form ducts leading the burned gases from the exhaust diffuser to the regenerators;

FIGURE 19 is a top plan view of the stamping;

FIGURE 20 is a cross-sectional view in elevation taken along the line 20—20 of FIGURE 19;

FIGURE 21 is an elevational view in cross section showing the construction within the gear box as well as the connections to the automatic transmission and a portion of the drive for the rear wheels of the vehicle;

FIGURE 22 is a partially schematic end elevational view of the gearing within the gear box taken along the line 22—22 of FIGURE 21;

FIGURE 23 is a cross-sectional view of the gearing taken along the line 23—23 of FIGURE 22;

FIGURE 24 is a fragmentary cross-sectional view taken along the line 24—24 of FIGURE 21 and showing the overrunning clutch;

FIGURE 25 is a plan cross-sectional view taken along the line 25—25 of FIGURE 22 and showing the chain- and sprocket connection for the core drive;

Figure 1:
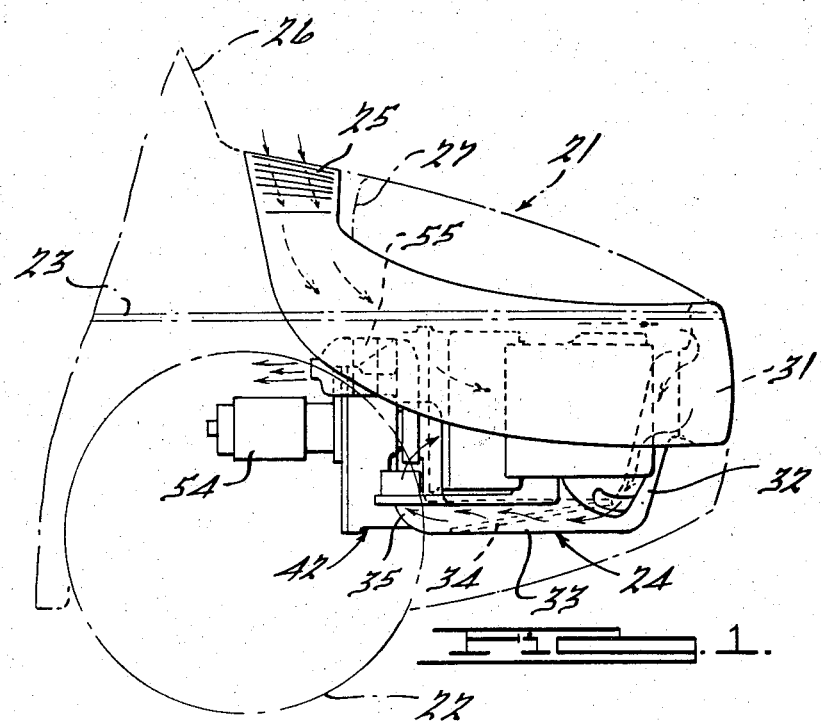
FIGURE 1 is a side elevational view of the rear portion of an automotive vehicle showing the location of the improved gas turbine therein.
Figure 2:
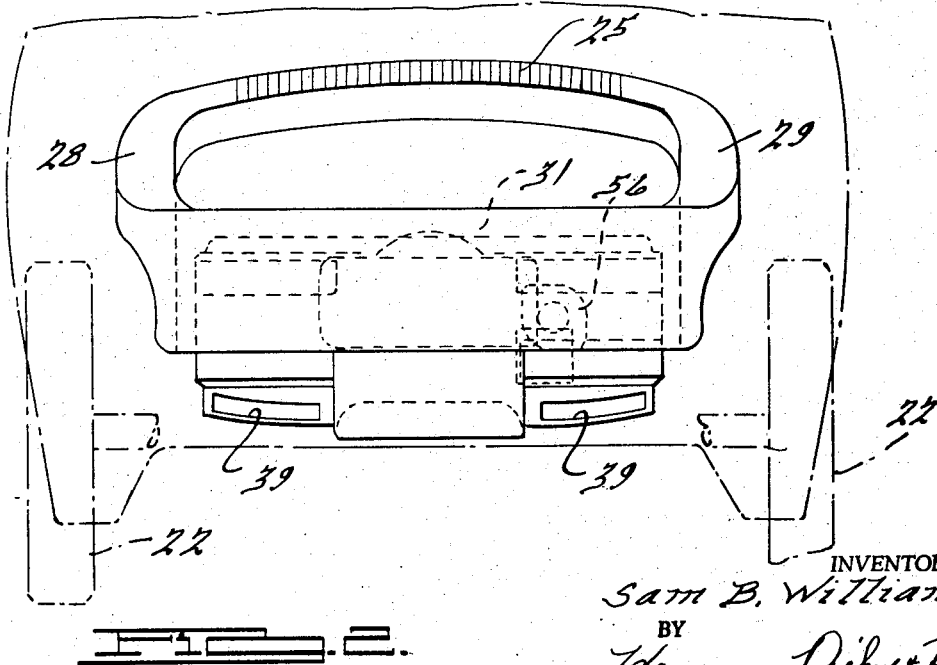
FIGURE 2 is a rear elevational view of the automotive vehicle.

FIGURES 26 to 28 are views similar to FIGURES 1 to 3 respectively, but showing a modified positioning for the intake air grills especially suitable for station wagons; and FIGURES 29 to 31 are views similar to FIGURES 1 to 3 showing another embodiment of the air intake arrangement in which the curved ducts extend directly from the intake grill to a pair of oppositely disposed intake chambers attached to the turbine housing.

Briefly, the illustrated embodiment of the invention comprises a gas turbine engine having a power shaft surrounded by a compressor shaft, with an annular burner surrounding these shafts. The discharge from the radial compressor is fed outwardly to opposite sides of the engine, where it enters four rotary type axial flow regenerators. These regenerators are mounted in two coaxial pairs disposed on opposite sides of the main turbine axis, the two axes of the regenerator pairs being perpendicular to and spaced a considerable distance from the turbine axis. The regenerators of each pair are vertically spaced from each other along their axis. The entire unit has a general or overall configuration slightly resembling a T, that is, the height of the housing is no greater than that needed to accommodate the compressor, burner and turbine wheels, those portions of the housing enclosing the exhaust passages and heat exchanger pairs extending rearwardly and to both sides of the housing portion which encloses the compressor, burner and turbine wheels.

The engine is mounted in the rear portion of an automotive vehicle below the deck, the exhaust gases emitted from the engine being led downwardly and rearwardly from the rearward portions of the housing wings which enclose the regenerators. The exhaust gases may thus be led directly to the atmosphere without the need for additional ducts. The intake air may be fed through grills on the after portion of the vehicle and ducts which pass around both sides of the engine housing and return beneath the engine through a silencer and filter arrangement disposed beneath the engine housing, and thence enter the compressor intake chamber.

The housing is composed mainly of four pairs of sheet metal stampings, the stampings in each pair being substantially identical with open sides facing each other and edges which are in either abutting or overlapping relation and are brazed together. One pair of stampings, referred to as ahe main housing stampings, serves as the main outer rearward portion of the housing and conducts exhaust gases exiting from the regenerator pairs to the atmosphere. A second pair of stampings, referred to as the compressed air duct stampings, leads the air delivered from the compressor to the spaces above and below the forward portions of each pair of regenerators so that this air may flow into the regenerators.

A third pair of stampings, referred to as the heated air duct stampings, has wings disposed in the spaces between the regenerators of the two pairs forwardly of their axes and receives the heated air delivered from the regenerators conducting this air to a chamber surrounding the burner.

A fourth pair of stampings, called the exhaust gas duct stampings, encloses the exhaust gas diffuser which leads from the second stage turbine wheel and has wings disposed between the regenerators of the two pairs rearwardly of their axes, delivering the hot exhaust gases to the two regenerators. The main housing stampings form chambers above and below the regenerators rearwardly their axes for receiving the exhaust gases exiting from the regenerators and delivering them to the atmosphere. Except for the relatively small annular area of an intermediate support ring, the only portions of the housing which are exposed to the atmosphere are those of the main housing stampings and of the compressed air stampings. No substantial portion of the outer housing surface will therefore be at a temperature higher than that of the cooled exhaust gases leaving the regenerators, and the need for heat insulation is thus largely eliminated.

The rear wall portions of the main housing stampings are provided with openings having arcuate covers removably secured thereto. Removal of these covers permits access to the regenerator cores and their adjacent seals, which may be inserted or removed by merely slipping them into and out of the housing, without disturbing the structure or alignment of the remaining engine components.

The turbine housing is secured to and supported by a gear box housing disposed forwardly thereof. The power shaft is rotatably mounted within the compressor shaft, the forward bearing of the latter being supported directly by the gear box housing. The forward ends of the compressed air duct stampings are also secured to the gear box housing. An annular ring secured to the rearward portions of the compressed air duct stampings supports the burner and the turbine wheel shroud, the latter in turn supporting the rear bearings of the compressor and power shafts through the second stage nozzles, an inner turbine wheel shroud, and a ring of relatively thin cross section disposed between the inner shroud and the member which directly supports the bearings. The latter is a massive member disposed within an annular oil collection chamber and also acts as a heat sink for oil entering the chamber from the rear shaft bearings. The thin ring carries the main temperature gradient, thus insuring concentricity of the assembly.

Means are provided for insuring a completely internal oil circulating system for the rear as well as the forward shaft bearings. The oil for the rear bearings is fed rearwardly from a reservoir in the gear box through the power shaft by means of an oil pump and the effect of power shaft rotation. The oil lubricates the rear bearings and then passes into the collection chamber mentioned above. At the same time, air pressure is bled from the compressor diffuser through an annular passage between two coaxial parts of the compressor shaft to the collection chamber. An oil return passage is provided in the lower portion of the rear bearing support leading from the collection chamber to the annular space between the power and the compressor shafts. The compressed air will force the oil from the collection chamber through the return passage and into this annular space. The forced oil will be forced by rotation of the compressor shaft through the turbine to the reservoir. Upon shutdown, damage to oil collecting in the chamber will be prevented by the presence of the heat sink.

The compressor shaft supports the forward bearing of the power shaft, which is a sleeve bearing. This will insure proper bearing support for the power shaft when it is stalled with high torque and therefore exerts maximum load on its bearing, since the compressor shaft will keep rotating and therefore maintain the hydrodynamic load-carrying film.

A bleedoff or bypass valve is provided between the first stage turbine wheel and the second stage nozzle vanes, this bleedoff valve taking the form of radial apertures in the outer shroud, these apertures being covered by a band of flat cross-sectional shape which may be slightly lifted to open the apertures. Since during idling the rear wheels will be braked but still connected to the second stage turbine wheel, a predetermined back pressure would normally exist at the first stage turbine wheels. Opening of the bleedoff valve will decrease this back pressure, thereby permitting the gas temperature into the first stage to be reduced for the same first stage speed. Since the lower gas temperature can be obtained with a lower fuel flow rate, the result will be that less fuel will be used at idling speeds than would be necessary without the bleedoff valve.

The compressor shaft is used to drive accessories including an automatic transmission oil pump. The power shaft is connected to the automatic transmission, and a conventional arrangement is used wherein the drives for the transmission oil pump and power are through concentric gears. An overrunning clutch is placed between these concentric gears, which rotate at relative speeds such that the clutch will normally be inoperative. However, should the power train reach an excessive speed (for example, with the rear wheels spinning on ice) which might cause damage to the second stage turbine wheel or other parts, the overrunning clutch will serve to connect the power train to the turbine compressor, thus in effect braking the power train.

The regenerator matrix shafts are connected to the driving train by a chain and sprocket arrangement which, because of its size tolerances, will insure proper matrix rotation despite relative movements of parts of the turbine components due to temperature variations.

Referring more particularly to the drawings, and particularly to FIGURES 1 to 3, the reference numeral 21 indicates generally an automotive vehicle having rear wheels 22 and a rear deck 23 beneath which is mounted the gas turbine engine generally indicated at 24. An air intake grill 25 is provided between the rear window 26 of the vehicle and the truck hood 27, a pair of ducts 28 and 29 leading laterally and rearwardly from the grill and alongside the walls of the trunk to a chamber 31 at the rear of the vehicle. It should be noted that FIGURES 1 to 3 do not fully show portions of the vehicle adjacent the gas turbine, these being merely shown in phantom lines. The length of ducts 28 and 29 will permit trapping of moisture in the intake air. A duct 32 leads downwardly and forwardly from chamber 31 centrally of the vehicle, this duct leading to an air filter and silencer chamber 33 beneath turbine 24. This chamber is of large enough size to accommodate a silencing and filtering unit 34 through which the air flows, the air then being conducted upwardly through a duct 35 to a compressor inlet chamber 36, seen in FIGURE 4.

Exhaust gases from the turbine are fed downwardly and rearwardly from the main turbine housing indicated generally at 37 in FIGURE 6, through louvers 38 in this housing to a pair of exhaust discharge ducts 39 of downwardly and rearwardly flared shape, these ducts having rearwardly facing openings 40. As will be seen in FIGURES 1 and 2, openings 40 are immediately adjacent the underside of the rear end of the vehicle, so that the exhaust gases need not be conducted further by means of conduits but may be emitted directly to the atmosphere.

The general arrangement of the turbine itself is perhaps best seen in FIGURE 3. The exterior of the housing is mainly formed by main housing 37, together with a compressed air housing generally indicated at 41 and a gear box housing generally indicated at 42. These housings are in general alignment along the longitudinal axis of the turbine, but housings 37 and 41 also extend laterally to both sides, forming what might be termed "wings" which are generally indicated in FIGURE 3 at 43 and 44. These wings each contain a pair of rotary type axial flow regenerator matrices, one pair being seen in FIGURE 6 where the upper matrix is generally indicated at 45 and the lower matrix at 46. Each matrix has a solid hub 47 non-rotatably secured to a vertically disposed shaft 48, a solid outer rim 49, and a main portion comprising many axially extending passages 51 formed of heat retaining material. Hot exhaust gases flowing through the passages during one portion of their travel will heat the matrix so that this heat may be transmitted to the compressed air flowing through the same passages during another portion of their travel.

Shaft 48 is supported by an upper bearing 52 and a lower bearing 53, these bearings in turn being secured to main housing 37 in a manner described in detail below. Matrices 45 and 46 are spaced vertically from each other, but it will be noted that except for the downward extent of ducts 39, the total height of the wings 43 and 44 is no greater than that of housings 37 and 41.

Before entering a detailed description of the turbine interior, housing and duct means, it may be well to mention several other accessory components of the engine, seen in FIGURES 1 to 3. A starter 54 is mounted on the forward end of gear box housing 42, as seen in FIGURES 1 and 3, and adjacent the starter is an oil cooler and fan assembly 55, the air from the fan being emitted forwardly as shown by the arrows in FIGURE 1. An alternator 56, seen in FIGURE 2, and a fuel control assembly 57, indicated in FIGURE 3, are also mounted on gear box housing 42.

Gear box housing 42 has an internal wall 58 separating the gear space 59 thereof (see FIGURE 4) from compressor inlet chamber 36. The rearwardly extending wall 61 of gear box housing 42, which encloses chamber 36, has a flange 62, and a compressor support ring 63 is secured thereto by bolts 64. The compressor is generally indicated at 65 and comprises a compressor housing 66 secured to support ring 63 by bolts 67, and compressor blades 68 rotatably mounted within housing 66. Entrance vanes 69 extend radially between housing 66 and a rearwardly extending portion 71 on wall 58. A compressor diffuser 72 having radial ribs 73 is mounted outwardly of the radially extending portions of blades 68, and is adapted to direct the compressed air radially and then axially rearwardly. A fuel supply connection 74 is provided in compressor housing 66 leading to a fuel line 75 in one of the ribs 73. Line 75 leads inwardly to a conduit 76 formed in a member 77 centrally secured to ribs 73, and this conduit leads to an annular space 78 formed by elements secured to member 77 and disposed within an annular combustion chamber generally indicated at 79. This combustion chamber is of the general configuration shown in Williams Patent No. 3,077,076, dated Feb. 12, 1963, having air entrance louvers 81 and 82 together with radial passages 83 for leading heated compressed air from a chamber 84 surrounding the combustion chamber to its interior.

The entire gas turbine rearwardly of gear box 42 is supported in cantilever fashion by the gear box, and this support is primarily through compressed air housing 41. This housing is composed of two identical stampings, one of these stampings being shown in detail in FIGURES 12 to 14, and being generally indicated at 85 in these figures. Housing 41 is fabricated by placing two stampings 85 in facing relation with their outwardly bent edges 86 being brazed together in overlapping relation. Each stamping 85 comprises a semicircular central portion 87 having a forward edge 88 of relatively large diameter and a rear edge 89 of relatively narrow diameter, portion 87 being convex outwardly so that the two stampings 85 together form a chamber surrounding the rearwardly directed exit of diffuser 72. Forward edge 88 is secured to compressor support ring 63, as seen in FIGURE 4, and rear edge 89 surrounds and is in contact with a heated air housing which is later described.

Each stamping 85 has a pair of wings 91 and 92, seen in FIGURE 13, which extend laterally on opposite sides of central portion 87, the height of these wings being approximately the full height of edge 88, as seen in FIGURE 14. Each wing has a vertical forward wall 93 the inner portion of which extends laterally and the outer portion of which curves rearwardly so as to conform with the curvature of the forward portions of regenerators 45 and 46. The outer wall 94 of each wing 91 and 92 is convex outwardly so as to form a chamber above each regenerator 45 and below regenerator 46, as seen in FIGURE 6. Walls 93 end abruptly at the points indicated at 95 and 96 in FIGURE 13, and the rearwardly facing portions of wings 91 and 92 are open. The rearward edges of walls 94 terminate in flanges 97, and the sides of central portion 87 have narrow vertical walls 98, as seen in FIGURES 12 and 14. Flanges 97 and walls 98 engage the stampings which comprise main housing 37, as will later appear, this main housing being shown partially in phantom lines in FIGURE 14.

Figure 4:
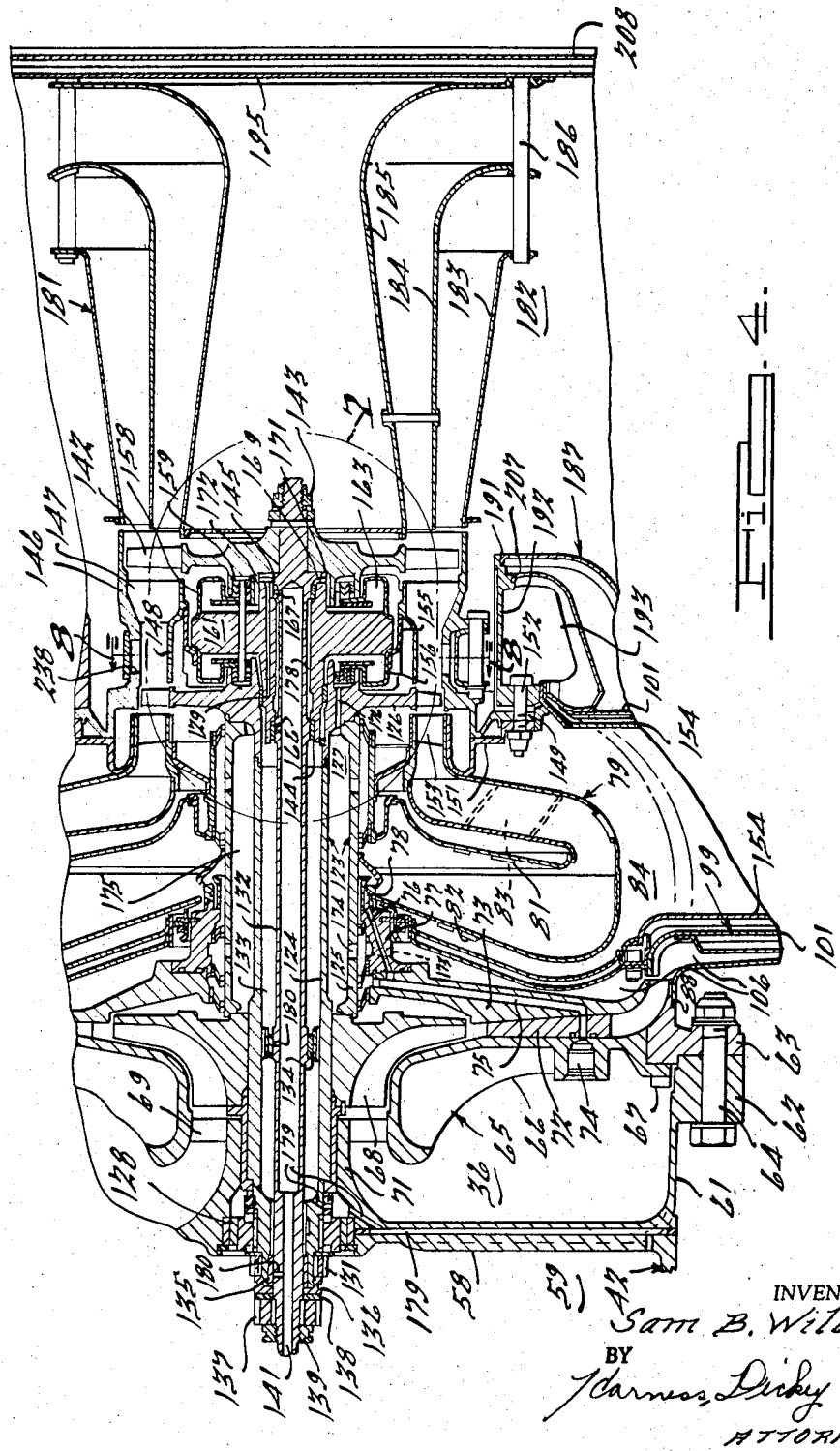
FIGURE 4 is a plan view in cross section showing the internal construction of the gas turbine, parts being broken away.

The heated air housing is generally indicated at 99 in FIGURES 4 and 6, and is made up of two identical stampings each of which is generally indicated at 101, and one of which is shown in detail in FIGURES 15 to 17. To form housing 99, two stampings 101 are placed in edge-to-edge relation with their outwardly extending flanges 102 forming a brazed butt joint. The central portion 103 of each stamping 101 is semicircular in shape, its forward edge 104 being of relatively large diameter and its rear edge 105 of relatively narrow diameter. The overall configuration of the central chamber formed by portions 103 is similar to that formed by portions 87 of stampings 85, except that it is smaller; that is, it fits within portions 87 of stampings 85 so as to form an annular space 106 therebetween which receives the compressed air from diffuser 72. As stated previously, edges 89 of stampings 85 are in sealing contact with rear edge 105 of stampings 101, thus closing the rear end of chamber 106. The arrow 107 in FIGURE 14 indicates the flow of compressed air from space 106 between housings 41 and 99 (housing 99 is shown partially in dot-dash lines in FIGURE 14), through the chambers formed by portions 94 of housing 41 to the regenerator matrices 45 and 46.

Each stamping 101 is provided with a pair of wings 108 and 109, indicated in FIGURE 16. The four wings of the two stampings thus form two heated-air receiving chambers, one such chamber being indicated at 111 in FIGURE 6. Each chamber 111 is disposed between the matrices 45 and 46 of a pair of regenerators, and have openings 112 and 113 which face matrices 45 and 46 respectively. Seals 114 and 115 are disposed between openings 112 and 113, respectively, and their adjacent matrices. These seals may be of any appropriate construction which will permit rotation of the regenerators while preventing leakage of the heated compressed air.

The general configuration of wings 108 and 109 is best seen in FIGURE 16, the wings having forwardly facing vertical walls 116 and 117, respectively, which follow the configuration of walls 93 of stampings 85, but are spaced inwardly therefrom, as seen in FIGURE 6. The rearwardly facing vertical walls 118 and 119 of wings 108 and 109 respectively are convex rearwardly but to a lesser degree than the forward convexity of walls 116 and 117. Walls 116 to 119 all extend radially inwardly to central portion 103 of stamping 101, so that they form parts of connecting passages leading the heated air from wings 108 and 109 to the central chamber formed within portions 103 of the two mating stampings. This central chamber is indicated at 84 in FIGURE 4, and the connecting passages between wings 108 and 109 and chamber 84 are indicated at 121 and 122 in FIGURES 15 and 17.

The compressor shaft is generally indicated at 123 and comprises an inner shaft 124 and an outer shaft 125, these shafts extending between first stage turbine wheel 126 and compressor 68 with an annular space 127 therebetween. More particularly, outer shaft 125 extends between an outer portion of the turbine wheel hub and the compressor hub, while shaft 124 extends from an inner portion of the turbine wheel hub through the compressor and through gear box wall 58, the gear box wall supporting a forward compressor shaft bearing 128, as seen in FIGURE 4. A rear bearing 129 is also provided for the compressor shaft, this bearing being disposed within the turbine wheel hub (see FIGURE 7), and the manner of supporting it is described below. An accessory drive pinion 131 is secured to inner compressor shaft 124 on the forward side of wall 58.

A power shaft 132 is provided coaxially within and spaced inwardly from inner compressor shaft 124, a space 133 being provided between shaft 132 and shaft 124. An intermediate bearing 134 for shaft 132 is provided within space 133, and power shaft 132 extends forwardly through wall 58 with a forward bearing 135 being provided within outer compressor shaft 124 forwardly of wall 58 and rotatably supporting power shaft 132. This may be a sleeve type of bearing held in place by a nut 136 threadably mounted on the forward end of outer compressor shaft 124. It will thus be noted that when power shaft 132 is stalled, that is, when it is not rotating because the automotive wheels 22 to which it is geared are held immobile, a hydrodynamic film of oil will still be maintained with respect to bearing 135 because of the fact that it is supported by continuously rotating shaft 124. It does not matter, for this purpose, whether sleeve bearing 135 is fixed to power shaft 132, compressor shaft 124, or neither. The maintenance of the hydrodynamic oil film is quite important when shaft 132 is held immobile since it is at that time that the maximum radial force will be exerted on this shaft.

A power pinion 137 is secured to shaft 132 outwardly of nut 136, being separated therefrom by a thrust washer 138 and being held in place by a nut 139. An axial oil passage 141 is provided within power shaft 132, this passage leading from the forward end of the power shaft through the entire shaft, stopping just short of that portion which is fixed to the hub of second stage turbine wheel 142. This wheel is secured to the rear end of the power shaft by a nut 143.

The structure which, among other things, supports the rear bearing 129 of compressor shaft 123, as well as the two rear bearings 144 and 145 of power shaft 132, will now be described. An annular outer shroud 146 is provided, this shroud being secured within the rear portion of main housing 37 in a manner described below. Second stage nozzle vanes 147 extend inwardly from this shroud, their inner ends being supported by an inner shroud 148. Outer shroud 146 extends forwardly from vanes 147, surrounding first stage turbine wheel 126 and having an outwardly extending flange 149 to which is secured a burner and first stage nozzle support 151 by bolts 152. Member 151 extends inwardly and engages the exit portion of burner 79 which in turn encloses first stage nozzles 153. It may also be mentioned at this point that a heat shield 154 is provided in chamber 121 and inwardly of stampings 101, this shield being secured at its rearward end to shroud 146.

An annular axially extending connecting member 155 of relatively thin cross-sectional shape is secured at its rearward edge to the internal surface of inner shroud 148 and extends forwardly and slightly inwardly therefrom. An annular stamping 156 is secured at its outer edge to the forward edge of member 155 and extends forwardly, then inwardly and then rearwardly therefrom, its inner edge turning inwardly with a seal 157 being disposed between the hub of turbine wheel 126 and the inner edge of stationary member 156. A similar stationary member 158 (members 156 and 158 may be identically shaped stampings) is disposed in spaced facing relation with member 156, a seal 159 being provided between the inner edge of member 158 and turbine wheel 142. The space between members 156 and 158 is partially occupied by a combined bearing support and heat sink 161. This member is a relatively massive and radially extending member of heat-conductive material, and bearings 144 and 145 are mounted in the interior of its axially extending hub, bearing 129 being mounted on the exterior of the hub. A plurality of circumferentially spaced tubular members 162 extend axially between seals 157 and 159, members 162 serving to supply pressurized air to seal 159 which enhances its sealing action.

The oppositely facing edges of the outer rim of member 161 are sealed to the outer edges of members 156 and 158, thus forming an oil collection chamber 163 which exists on both sides of member 161, a cross passage 164 extending through the lower end of this member. A pair of radial drip plates 165 are mounted within chamber 163, extending from the inner portion of the reservoir partially toward the outer portion. Drip plates 165 will serve to collect oil droplets entering chamber 163 and lead this oil to the bottom of the chamber where it will collect.

Radial oil passages 166 and 167 are provided in power shaft 132 for delivering oil from the passage 141 therein outwardly of bearings 144 and 145, respectively. The oil will flow from bearing 144 through a passage 168 in the hub of member 161 toward bearing 129. The oil from both bearings will flow outwardly through radial passages 169 in an enlarged portion 171 of shaft 132, which is immediately rearwardly of the elongated hub of member 161. A space 172 exists between the hub of member 161 and the hub of turbine wheel 142, the latter hub being recessed for this purpose. This annular passage 172 connects passages 169 with chamber 163, so that the oil from bearings 145 will collect in this chamber.

One or more passages 173, seen in FIGURE 4, are provided in member 77 leading from the inner portion of pressurized chamber 106 behind burner 79 to the outside of outer compressor shaft 125. One or more passages 174 are provided in shaft 125 adjacent passage 173 so that compressed air is led to the annular chamber 127 between outer compressor shaft 125 and inner compressor shaft 124. One or more axially extending passages 176 are provided in the hub of turbine wheel 126 leading from chamber 127 to the forward side of seal 157. Compressed air may pass this seal and enter chamber 163, thereby pressurizing the oil collected therein.

As seen in FIGURE 7, a radial passage 177 is provided in the lower end of member 161 leading inwardly from passage 164 to an axially extending passage 178 which leads forwardly to passage 168 and from there to the space 133 between power shaft 132 and inner compressor shaft 124. As noted previously, this space contains bearing 134, and a narrower forward portion of this space leads to forward bearing 135 of power shaft 132. Radial passages 180 (FIGURE 4) are provided in shaft 132 for lubricating bearings 134 and 135. It will thus be seen that during operation oil which has lubricated the rear bearings and collected in chamber 163 will be forced by the compressed air upwardly through passages 177, 178 and 168 (which of course are not subjected to centrifugal force since they are stationary) into space 133, and will travel forwardly due to the rotary effect of shaft 124, flowing past axial grooves in the support for bearing 134. Drain passages 179 are provided for leading the oil from the juncture of the wide and narrow portions of space 178 to the gear box reservoir. Bearing 129 separates chamber 163 and space 133, thus receiving lubrication from these sources. The inner diameter of bearing 129 is smaller than the diameter of the bore of shaft 124 so that bearing 129 will act as a dam to prevent rearward flow of oil from space 133 into the collection chamber.

It should be observed with regard to member 161 that because of its relatively massive nature it will tend to absorb heat from the oil in chamber 163, thus minimizing the possibility of oil overheating after shutdown. It should also be noted that the maximum temperature gradient between those portions of the turbine in direct contact with the burned gases and the inner portions of the turbine housing will be relatively thin concentric member 155. Thus, temperature differentials will not tend to cause any unwanted lateral distortions of the ports.

The spent gases leaving second stage turbine wheel 142 pass through a diffuser generally indicated at 181 into a burned gases chamber 182 rearwardly of turbine wheel 142. Diffuser 181 comprises three concentrically arranged nested members 183, 184 and 185 which form annular spaces of increasing size in a rearward direction, the members being curved radially outwardly and secured together at their rearward ends by fasteners 186. Chamber 182 is formed by a pair of identical stampings, one of which is shown in FIGURES 18 to 20 and is indicated generally at 187. As previously described with respect to stampings 85 and 101, the two stampings 187 are placed with their open sides in facing relation and their outwardly turned edges 188 forming a sealed butt joint. The central portion 189 of each stamping 187 is of semicircular shape, with its forward edge 191 being secured to the rear edge of a housing ring 192, as seen in FIGURE 4. The forward end of this ring has an outwardly extending flange which is secured to member 151 by bolts 152. As will be later seen, bolts 152 are all accessible from outside the unit, a pair of spaces 193 and 194 existing adjacent housing 37 when viewed in plan, as seen in FIGURES 3 and 4.

Portion 189 of each stamping 187 widens in a rearward direction, as seen in FIGURE 20, and has an end wall 195, the end walls of the two stampings mating immediately outwardly of exhaust diffuser 181. Each stamping further has a pair of laterally extending wings 196 and 197, seen in FIGURE 19, which connect chamber 189 with the space between the rearward portions of each pair of regenerators 45 and 46. Each pair of mating wings 196 and 197 thus forms a chamber indicated at 198 in FIGURE 6, this chamber being of somewhat segmental shape, as seen in FIGURE 20, and extending through an arc of slightly greater than 180°. The relative areas of the compressed air and exhaust gas portions of the regenerators are of course chosen to provide optimum heat transfer efficiency for the unit. The forwardly facing portions of the vertical walls which form part of wings 196, 197 are of slightly concave shape in a forward direction so as to conform to the shape of the walls 118 and 119 of stampings 101. They also have indentations indicated at 199 in FIGURE 20 to accommodate the shafts 48 which support and drive the regenerators. The rearwardly facing portion of the walls of wings 196 and 197 are of rearwardly convex shape and are concentric with the curvature of the regenerators, extending somewhat rearwardly therefrom as seen in FIGURE 6.

Wings 196 and 197 have segmental openings 201 and 202 respectively in the walls which face regenerators 45 and 46, so that the exhaust gases may flow outwardly from chambers 198 in upward and downward directions through the regenerator passages 51. Seals 203 and 204 are provided between wings 196 and 197 and their corresponding regenerators.

Main housing 37 is made up of two substantially identical stampings, the upper of which is shown in detail in FIGURES 9 to 11, and is indicated generally at 205. As in the case of the other stampings, each of the two stampings 205 has a central portion and a pair of laterally extending wings, and the two stampings are united by brazing their facing edges together. The central portion of each stamping 205 is indicated at 206 in FIGURES 9 and 10. Portion 206 is of semicylindrical shape, having a forwardly facing edge 207 which is secured to ring 192 a slight distance forwardly of edges 191 of stampings 187. The enclosure formed by portions 206 of the two united stampings 205 enclose and are spaced slightly outwardly from the burned gases chamber 182 formed by portions 189 of stampings 187. This can be seen by comparing FIGURE 20 with FIGURE 11, by which it will be seen that portion 206 of each stamping 205 enlarges as it extends rearwardly, and is provided with a rearward end wall 208 spaced slightly outwardly from wall 195, a dead air space existing between these two walls.

It should be noted that the forward edge 207 of each stamping 205 is spaced rearwardly from the overlapping rearward edges 89 and 105 of stampings 85 and 101 respectively, ring 192 extending across this space.

Wings 209 and 211 of each stamping 205 extend not only laterally from central portion 206 but also extend forwardly and rearwardly therefrom, as seen in FIGURE 10. The portions of wings 209 and 211 which extend forwardly from edge 207 (toward the bottom of the drawing in FIGURE 10) are enclosed by wings 91 and 92 of stampings 85, as seen in FIGURE 14, and have openings 212 and 213 respectively for receiving the compressed air flowing inwardly to the regenerators, as shown by wavy arrow 107 in this figure. These portions of the wings have vertical walls 214 and 215 respectively, which are greater in height than semicylindrical portions 206, these walls conforming to the shape of walls 93 of stampings 85 and lying flush against their inner surfaces. The inner portions of walls 214 and 215 extend inwardly at right angles to the turbine axis, as seen in FIGURE 10, and terminate adjacent the central portions 103 of stampings 101. Openings 218 and 219 are provided which face the central portions 103 of stampings 101 and surround the connecting portions between the wings and central portions of stampings 101.

The outer portions of walls 214 and 215 conform generally to the shapes of the regenerators at their forward portions, but extend somewhat rearwardly from the regenerators at their rearward portions as seen in FIGURE 10. Domes 221 and 222 are provided in wings 209 and 211, which are of somewhat segmental shape. The forward portions of these domes conform generally to the forward portions of openings 201 and 202 of stampings 187, as will be seen by comparing FIGURES 10 and 19. The rearward portions of the domes, which slope outwardly as seen in FIGURE 6, extend somewhat rearwardly of the rearward portions of openings 201 and 202, ending adjacent the rearward portions of walls 214 and 215. The presence of domes 221 and 222 will increase the volume into which the cooled exhaust gases may flow.

The lower stamping 205 is provided with louvers 38, as seen in FIGURE 6. These louvers are formed in domes 221 and 222 and are directed downwardly and rearwardly. In this sense the lower stamping 205 is not identical with the upper stamping, but the two stampings could still be made with the same set of dies, the lower stamping then being placed in an additional set of dies to form the louvers. Exhaust outlet ducts 39 are separate stampings secured to the wings of lower stamping 205 below louvers 38. Stampings 39 are downwardly flared, with openings 40 being directed rearwardly.

Means are provided for readily removing or replacing the two pairs of regenerators 45 and 46 as well as their adjacent seals 114, 115, 203 and 204. This means includes a pair of arcuate openings 223 and 224 in the upper rearward portions of walls 214 and 215 of the wings of stampings 205. Openings 223 and 224 have horizontal upper and lower edges and vertical side edges, and their height is slightly greater than that of regenerators 45 and 46. The openings extend around the walls sufficiently to enable the regenerators and seals to be moved into and out of the stampings along the paths indicated in dashed lines at 225 and 226 in FIGURE 10. Shaft 48 is installed in an axially removable manner to permit removal and replacement of the regenerators and seals, and for this purpose bearings 52 and 53 are mounted in housings 227 and 228 respectively carried by apertured portions of stampings 205, as seen in FIGURE 6, with snap rings 229 retaining them in position against the shouldered portions of the housings. The lower end of each shaft 48 carries a sprocket 231 which is held by a removable snap ring 232, and the upper end is enclosed by a cap 233, held by a snap ring 234.

Removable covers 235 and 236 are provided on the upper and lower stampings, the two covers 235 being for the openings 223 and 224 in the upper stamping 205 and the two covers 236 for the openings in the lower stamping 205. These covers are of arcuate sheet metal construction and slightly overlap the edges of the openings, being held within the openings by screws 237, as seen in FIGURE 6. Because of the space existing forwardly of these covers and the fact that they may be flexed, removal of the covers may be easily accomplished.

The means for controlling the bypass of combustion gases between the first and second stages, especially useful during idling as described above, comprises a plurality of circumferentially spaced radially extending passages 238 in shroud 146, as seen in FIGURES 4 and 8. A band 239 surrounds most of shroud 146 and overlaps passages 238. One end of this band is fixed to shroud 146 by a pin 241, and the other end is adjustable by a control lever 242 to which it is secured by a pin 243. Leftward movement of lever 242 in FIGURE 8 by any appropriate control means will lift the band from the passages, bypassing more or less of the gases depending upon the adjustment of the lever. Rightward movement of lever 242 will close the bypass passages.

Turning now to FIGURES 21 to 25, which show the gear box arrangement and core drive, chamber 59 of the gear box is enclosed by wall 58 and a forward gear box wall 244, as seen in FIGURE 21. An automatic transmission housing is partially shown in the drawing at 245, this housing extending forwardly of gear box 42. The automatic transmission is of conventional construction and need not be shown in detail. However, it should be pointed out that two separate drives must be provided for the automatic transmission, one being the power drive and the other the automatic transmission oil pump drive. As is conventional, these two drives comprise an automatic transmission power drive shaft 246 and an automatic transmission oil pump drive shaft 247, the latter being coaxially mounted within shaft 246.

Shafts 246 and 247 extend rearwardly from the automatic transmission housing, as seen in FIGURE 21, being disposed coaxially within a bevel gear 248 rotatably supported by a wall 249 of the automatic transmission housing. Bevel gear 248 is driven by the output (not shown) of the automatic transmission and in turn drives a ring gear (not shown) connected to the axles 250 (FIGURE 2) for vehicle wheels 22, the axis of the last-mentioned axles being disposed some distance forwardly of gear 248 and being at right angles to the paper in FIGURE 21.

Shaft 246 is driven by a gear 251 and shaft 247 by a gear 252. These two gears are conventionally arranged in coaxial relation with gear 252 being of slightly larger diameter than gear 251, the two gears being disposed on opposite sides of an internal wall 253 within gear box 42. This wall supports a bearing 254 which, together with a bearing 255 supported by wall 244, supports gear 251 on the opposite sides thereof, the gear having a spline connection 256 with shaft 246. A pair of bearings 257 and 258 are disposed within the elongated hub member 259 of gear 251 which is supported by bearing 254. Bearings 257 and 258 are axially spaced, and support a stub shaft 261 for gear 252. Shaft 261 has a spline connection 262 with shaft 247, this spline connection being disposed within the other hub member 263 of gear 251 which is supported by bearing 255.

A one-way overrunning clutch generally indicated at 264 is disposed between bearings 257 and 258 and serves to connect gears 251 and 252 in a manner described in detail below. The conventional construction of clutch 264 is seen in FIGURE 24, which indicates that shaft 261 has external teeth 265, these teeth having outwardly facing sloping surfaces on one side and substantially radial surfaces on the other side. Rollers 266 are disposed between the sloping surfaces of teeth 265 and the internally facing cylindrical surface 267 of hub member 259 between bearings 257 and 258. The action of clutch 264 will be such that, as long as hub member 259 rotates counterclockwise in FIGURE 24 at a faster rate than does shaft 261, the latter may rotate freely. However, should the counterclockwise rotational speed of shaft 261 attempt to exceed that of hub member 259 at any given moment, rollers 266 will be cammed outwardly by teeth 265, causing them to jam against surface 267. This will effectively prevent shaft 261 from rotating counterclockwise at a speed in excess of that attained by hub member 259.

As seen in FIGURES 22 and 23, gear 251 is driven by power pinion 137 through coaxial intermediate gears 268 and 269, these gears being mounted on a shaft 271 to the left of the central turbine axis, gear 268 meshing with pinion 137 and gear 269 with gear 251. Gear 252 is driven by accessory drive pinion 131 through coaxial gears 272 and 273, these gears being mounted on a shaft 274 to the right of the main turbine axis, as seen in FIGURES 22 and 23.

In operation, the relative rotational speeds of gears 251 and 252 will normally be such that overrunning clutch 264 is inoperative. As an example, if a vehicle 21 is proceeding at 45 miles per hour, gear 251 could be rotating at about 2400 r.p.m. and gear 252 at about 4000 r.p.m.

One situation which may arise creating the possiblity of excessive speed of second stage turbine wheel 142 would be when the driver attempts to accelerate a stationary vehicle, and both wheels 22 slip on icy pavement. In this case, gear 251 will tend to rotate faster than gear 252. This will cause engagement of overrunning clutch 264, so that the power train will tend to drive compressor 65. This will in effect brake the power train, preventing excessive speed of the second stage turbine wheel. Clutch 264 will automatically become disengaged when normal conditions prevail.

The gear ratios may of course be so chosen as to cause the braking effect to take place when the power and accessory trains are at any given percentage of their rated or full speeds.

The drive for each of the two regenerator core matrix shafts 48 is perhaps best seen in FIGURES 22 and 25. Gear 252 meshes with an intermediate gear 275 within gear box chamber 59, this gear being carried by a shaft 276 located to the left of the main turbine axis, as seen in FIGURES 22 and 25. Gear 275 in turn drives a gear 277 carried by a shaft 278 to the left of shaft 276, this shaft also carrying a gear 279. Gear 279 drives a gear 281 carried by a shaft 282 to the left of shaft 278. Shaft 282 carries a worm 283 meshing with a worm wheel 284 below it. Worm wheel 284 is fixed to a core drive cross shaft 285 which extends across the elongated interior of the gear box and carries two spaced worms 286 and 287 adjacent the opposite ends thereof. These worms mesh respectively with worm gears 288 and 289 carried by vertically disposed stub shafts 291 and 292 respectively, extending outwardly from the underside of the gear box. The outer ends of these stub shafts carry sprockets 293 and 294, respectively, which are at the same level as sprockets 231 carried by the lower ends of shafts 48.

Chains 295 and 296 respectively, connect sprockets 293 and 294 with sprockets 231. These chain-and-sprocket drives are of the same general type as used on bicycles, and have relatively large space tolerances between their respective chains and sprockets within which effective driving may take place. Any distortions or relative size changes between the housing components for the main turbine assembly and the gear box, due to temperature variations during operation, will not affect the reliability of the regenerator core drive. The drive of course has a high reduction ratio, so that, for example, when gear 252 is rotating at 4000 r.p.m. the regenerators may be rotating at 17½ r.p.m.

FIGURES 22 and 25 also illustrate additional accessory drives for pinion 131. In particular, a gear 297 is provided which is driven by intermediate gear 273 and in turn drives a gear 298 on an intermediate portion of shaft 299. Gear 297 is mounted on a shaft 301 and drives an engine oil pump 302 mounted in wall 244 of the gear box, this pump being connected by appropriate passages to oil passage 141. One end of shaft 299 may carry an oil cooler fan 303 for assembly 55, and the other end may form a starter drive indicated at 304 for starter 54. One end of shaft 282, seen in FIGURE 25, may carry a pulley 305 for driving alternator 56, and the other end, indicated at 306, may be used as a drive for fuel control assembly 57.

Although the operation of portions of the gas turbine and vehicle has been described above with reference to particular features, a brief review of the operation is here provided. Air passing into grill 25, through ducts 28, 29 and 32 and air filter and silencer chamber 33, will enter compressor inlet chamber 36 and flow through compressor 65 and diffuser 72. The compressed air will pass into annular space 106 between housings 41 and 99. From there the air will flow outwardly into the wings formed by housing 41, and from those four wings will flow downwardly through the two upper regenerator cores 45 and upwardly through the two lower regenerator cores 46, as seen in FIGURE 5. The heated air will enter the two receiving chambers 111 formed by wings 108 and 109 of heated air housing 99, flowing inwardly toward the central chamber 84 of housing 99 which surrounds combustion chamber 79.

The burned gases leaving the combustion chamber will drive first stage turbine wheel 126 and second stage turbine wheel 142, passing through exhaust gas diffuser 181 into chamber 182 formed by stampings 187. The exhaust gases will flow outwardly in opposite directions through the wings 196 and 197 of these stampings and then upwardly through the larger rearward segmental portions of upper regenerator matrices 45, and downwardly through matrices 46. The cooled exhaust gases will flow into the domes 221 and 222 formed in the wings of the rear portions of the main housing and then will exit through louvers 38. In so doing, the gases from upper matrices 45 will pass downwardly within the spaces bounded on the one hand by the rearward portions of the matrices and stamping wings 196 and 197, and on the other hand by covers 235 and 236 of main housing 37, as seen by the wavy lines in FIGURE 6.

Power pinion 137 driven by second stage turbine wheel 142 will drive power drive shaft 247 of the automatic transmission through gear 252, while accessory drive pinion 131 will drive the automatic transmission oil pump drive shaft 246 through gear 251. The overrunning clutch 264 between coaxial gears 251 and 252 will permit the compressor to brake the second stage turbine wheel should excessive speeds thereof be indicated.

FIGURES 26 to 28 show a modified air intake arrangement which is basically similar to that previously described, but is especially suited for station wagon installations. In this arrangement, a pair of air intake grills 25a and 25b are located in the quarter panels 401 and 402 of the body of vehicle 21a above rear wheels 22a. These grills are connected by ducts 28a and 29a to chamber 31 at the rear of the vehicle, this chamber leading to air filter and silencer chamber 33 beneath turbine 24 as described above. Grills 25a and 25b may be of rectangular shape, with their long sides extending horizontally, ducts 28a and 29a being of compoundly curved shape to fair into chamber 31 from both sides, as seen particularly in FIGURE 28.

FIGURES 29 to 31 shows still another arrangement, in which a grill 25 is connected to a pair of horizontally extending compressor inlet chambers 36a and 36b by duct means which does not extend to the rear of the vehicle and then underneath the turbine housing, but directly to these two inlet chambers which are mounted on opposite sides of the forward turbine housing portion, as seen in FIGURE 31.

In this arrangement, ducts 28' and 29' lead directly from the opposite ends of grill 25 downwardly and rearwardly to the outer ends of chambers 36a and 36b, resulting in an inclined U-shaped arrangement for both ducts, as seen in FIGURE 31. Silencing and filtering units (not shown) are located within ducts 28' and 29'. It will be apparent that the location of the air intake grill or grills shown in FIGURES 29 to 31 could be varied to suit individual requirements. For example, these grills could be located in the quarter panels of station wagons, as indicated in the embodiment of FIGURES 26 to 28.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a gas turbine engine, a compressor, a first stage turbine wheel, a hollow compressor shaft connecting said wheel and compressor, a second stage turbine wheel, a power shaft connected to said second stage turbine wheel and extending coaxially through said compressor shaft, said power shaft being spaced inwardly from said compressor shaft, rear bearings for said compressor and power shafts, an axial passage within said power shaft, means for delivering lubricating oil to the forward end of said passage, means at the rearward end of said passage for delivering said oil to the rear bearings of said compressor and power shaft, and means for returning said oil forwardly to the space between said power and compressor shafts, said last-mentioned means comprising a chamber adjacent said rear bearings and adapted to collect oil therefrom, a compressed air connection from said compressor to said chamber, and an oil return connection leading from said chamber to said space between said compressor and power shafts.

2. The combination according to claim 1, said compressed air connection comprising an outer compressor shaft surrounding and spaced from said compressor shaft, a conduit leading from the outlet of said compressor to the space between said compressor shaft and outer compressor shaft, and a passage leading from said last-mentioned space to said chamber.

3. The combination according to claim 1, said chamber comprising a pair of circular members in spaced relation, and a relatively massive circular member disposed between said last-mentioned members, said massive member serving to absorb heat from oil collected in said chamber.

4. The combination according to claim 3, further provided with an axial extension on said massive member, said rear compressor shaft bearing being supported by said extension.

5. In a gas turbine engine, a compressor, a first stage turbine wheel, a compressor shaft connecting said wheel and compressor, a second stage turbine wheel, a power shaft connected to said second stage turbine wheel and extending through said compressor shaft, a housing for said turbine, an outer turbine wheel shroud secured to said housing, an inner shroud within said outer shroud, nozzle vanes connecting said shrouds, an annular member of thin cross section extending substantially axially from end to end and having one end secured to the inside of said inner shroud, rear bearings for said compressor and power shafts, and supporting means for said rear bearings disposed between said wheels and secured to other end of said thin axially extending member.

6. The combination according to claim 5, said last-mentioned means comprising a chamber adapted to collect oil from said rear bearings, and oil passage means within said compressor shaft for delivering oil rearwardly to said rear bearings and returning the oil to the forward end of said turbine.

7. The combination according to claim 5, said gas turbine being further provided with an exhaust chamber for receiving burned gases exiting from said second stage turbine wheel, a portion of said chamber surrounding said outer shroud, passage means in said outer shroud connecting the space between said first stage turbine wheel and said nozzles with said exhaust chamber, and a selectively adjustable closure for said passage means.

8. The combination according to claim 7, said passage means comprising a plurality of circumferentially spaced radial passages, a band overlapping said passages, means fixedly securing one end of said band to said outer shroud, and means for adjusting the position of the other end of said band.

9. In a gas turbine engine, a compressor, a first stage turbine wheel, a compressor shaft extending between said first stage turbine wheel and compressor, said shaft comprising an annular inner shaft and an annular outer shaft spaced from said inner shaft, passage means connecting the outlet of said compressor with the space between said inner and outer compressor shafts, a second stage turbine wheel, a power shaft extending through said inner compressor shaft and connected to said second stage turbine wheel, said power shaft being spaced inwardly from said inner compressor shaft, an axial oil passage extending rearwardly through said power shaft, rear bearings for said compressor and power shafts, means supporting said rear bearings including a chamber for collecting oil therefrom, means for delivering compressed air from the space between said inner and outer compressor shafts to said chamber, and a return oil passage from said chamber to the space between said power and inner compressor shafts.

10. The combination according to claim 9, the bore of said inner compressor shaft having a predetermined diameter, the rear compressor shaft bearing comprising a sleeve within said bore, and stationary means within said sleeve supporting said bearing, the inner diameter of said sleeve being less than said predetermined diameter, whereby oil will be prevented from flowing rearwardly from said bore.

11. In a gas turbine engine, a compressor, a first stage turbine wheel, a compressor shaft connecting said wheel and compressor, a second stage turbine wheel, a power shaft connected to said second stage turbine wheel and extending through said compressor shaft, a housing for said turbine, a stationary support at the forward end of said turbine, said turbine housing being secured to said stationary support, whereby the entire turbine is supported thereby, an outer turbine wheel shroud secured to said housing, an inner shroud within said outer shroud, nozzle vanes connecting said shrouds, an annular member of thin cross section extending substantially axially from end to end and having one end secured to the inside of said inner shroud, rear bearings for said compressor and power shafts, and supporting means for said rear bearings disposed between said wheels and secured to the other edge of said thin axially extending member.

12. In a gas turbine engine, a compressor, a first stage turbine wheel, a compressor shaft extending between said first stage turbine wheel and compressor, said shaft comprising an annular inner shaft and an annular outer shaft spaced from said inner shaft, passage means connecting the outlet of said compressor with the space between said inner and outer compressor shafts, a second stage turbine wheel, a power shaft extending through said inner compressor shaft and connected to said second stage turbine wheel, said power shaft being spaced inwardly from said inner compressor shaft, an axial oil passage extending rearwardly through said power shaft, rear bearings for said compressor and power shafts, means supporting said rear bearings including a chamber for collecting oil therefrom, means for delivering compressed air from the space between said inner and outer compressor shafts to said chamber, a return oil passage from said chamber to the space between said power and inner compressor shafts, an oil reservoir at the forward end of said gas turbine, and a passage leading from said space between the inner compressor and power shafts to said reservoir.

13. In a gas turbine engine, a compressor, a first stage turbine wheel, a compressor shaft connecting said first stage turbine wheel with said compressor, a second stage turbine wheel, a driven member, a power train permanently connecting said second stage turbine wheel with said driven member, a spent gases chamber, a bypass leading from the space between said first and second stage turbine wheels to said chamber, means for adjustably controlling the size of said bypass, an outer shroud extending between said first and second stage turbine wheels, and nozzle vanes extending inwardly from said outer shroud, said bypass comprising radial passages in said outer shroud between said first stage turbine wheel and nozzles, said bypass control means comprising a band radially adjustably overlapping said radial passages.

14. The combination according to claim 13, further provided with an overrunning clutch between said power train and said compressor shaft, said overrunning clutch being responsive to the attainment of a predetermined speed of said power train relative to the speed of said compressor shaft to cause said compressor shaft to act as a brake on said power train.

References Cited
UNITED STATES PATENTS

| | | | |
|---|---|---|---|
| 2,619,797 | 12/1952 | Haworth | 60—39.16 |
| 2,627,717 | 2/1953 | Waller | 60—39.25 XR |
| 2,693,248 | 11/1954 | Gaubatz et al. | |
| 2,749,087 | 6/1956 | Blackman et al. | |
| 2,861,419 | 11/1958 | Hausmann. | |
| 2,951,337 | 9/1960 | Atkinson et al. | 60—39.08 |
| 3,271,949 | 9/1966 | Jones et al. | 60—39.16 |

JULIUS E. WEST, *Primary Examiner.*